United States Patent
Goto et al.

(10) Patent No.: US 10,909,962 B2
(45) Date of Patent: Feb. 2, 2021

(54) NOISE REDUCTION DEVICE, FLIGHT VEHICLE, POWER GENERATION DEVICE, AND NOISE REDUCTION METHOD

(71) Applicant: Kabushiki Kaisha Toshiba, Tokyo (JP)

(72) Inventors: Tatsuhiko Goto, Kawasaki Kanagawa (JP); Akihiko Enamito, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 412 days.

(21) Appl. No.: 15/899,729

(22) Filed: Feb. 20, 2018

(65) Prior Publication Data

US 2019/0088244 A1 Mar. 21, 2019

(30) Foreign Application Priority Data

Sep. 15, 2017 (JP) ................. 2017-177472

(51) Int. Cl.
*G10K 11/178* (2006.01)
*B64C 27/46* (2006.01)
(Continued)

(52) U.S. Cl.
CPC .......... *G10K 11/178* (2013.01); *B64C 27/001* (2013.01); *B64C 27/463* (2013.01);
(Continued)

(58) Field of Classification Search
None
See application file for complete search history.

(56) References Cited

U.S. PATENT DOCUMENTS 5,478,199 A 12/1995 Gliebe
5,515,444 A 5/1996 Burdisso et al.
(Continued)

FOREIGN PATENT DOCUMENTS

JP H01-159406 A 6/1989
JP H01-128000 8/1989
(Continued)

OTHER PUBLICATIONS

Honda et al., "Active Minimization of Blade Rotational Noise from an Axial Fan," Transactions of the Japan Society of Mechanical Engineers (Part C) (1993), 59:228-233, and English-language machine translation.
(Continued)

*Primary Examiner* — Qin Zhu
(74) *Attorney, Agent, or Firm* — Finnegan, Henderson, Farabow, Garrett & Dunner, L.L.P.

(57) ABSTRACT

According to one embodiment, a noise reduction device includes speakers, microphones, and a processing circuit. The speakers are arranged around a rotor and emit control sound based on control signals. The microphones are arranged around the rotor and convert the control sound and noise emitted by the rotor into microphone signals. The processing circuit generates the control signals for reducing acoustic power in positions of the microphones, based on the microphone signals, rotation speed of the rotor, and a phase of noise that reaches the microphones from the rotor.

27 Claims, 22 Drawing Sheets

(51) Int. Cl.
  *B64C 27/00* (2006.01)
  *B64C 27/72* (2006.01)
  *B64C 39/02* (2006.01)
  *B64C 11/00* (2006.01)

(52) U.S. Cl.
  CPC ............... *B64C 2027/7266* (2013.01); *G10K 2210/1281* (2013.01)

(56) References Cited

U.S. PATENT DOCUMENTS

| | | |
|---|---|---|
| 5,526,432 A | 6/1996 | Denenberg |
| 5,979,593 A | 11/1999 | Rice et al. |
| 6,201,872 B1 | 3/2001 | Hersh et al. |
| 7,327,849 B2 | 2/2008 | Sommerfeldt et al. |
| 10,210,856 B1 * | 2/2019 | Hefner .................... B64C 27/04 |
| 2006/0029233 A1 | 2/2006 | Sommerfeldt et al. |
| 2010/0028134 A1 * | 2/2010 | Slapak .................... F24F 13/24 |
| | | 415/119 |
| 2013/0284608 A1 * | 10/2013 | Blake ...................... F03D 13/20 |
| | | 205/464 |
| 2015/0158580 A1 * | 6/2015 | Kelaidis .................. B64C 27/82 |
| | | 244/1 N |
| 2016/0063987 A1 * | 3/2016 | Xu ....................... H04R 1/1083 |
| | | 381/71.12 |
| 2016/0362187 A1 * | 12/2016 | Armstrong ........... H02K 1/2706 |
| 2018/0204561 A1 | 7/2018 | Goto et al. |

FOREIGN PATENT DOCUMENTS

| | | |
|---|---|---|
| JP | H07-098593 A | 4/1995 |
| JP | H9-511810 A | 11/1997 |
| JP | H11-502032 A | 2/1999 |
| JP | 2003-233133 A | 8/2003 |
| JP | 2006-065324 A | 3/2006 |
| JP | 2006-211770 A | 8/2006 |
| JP | 2018-111461 A | 7/2018 |

OTHER PUBLICATIONS

Aoki et al., "Theoretical study on active control of rotational noise source using discrete ring sound source," Journal of the Acoustical Society of Japan (2004), 60:639-645, and English-language machine translation.

* cited by examiner

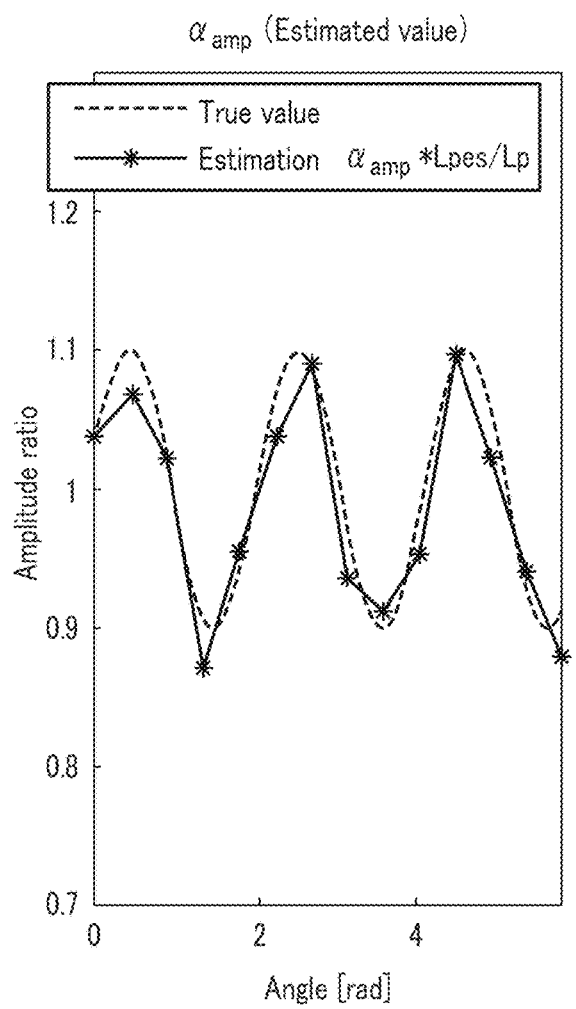 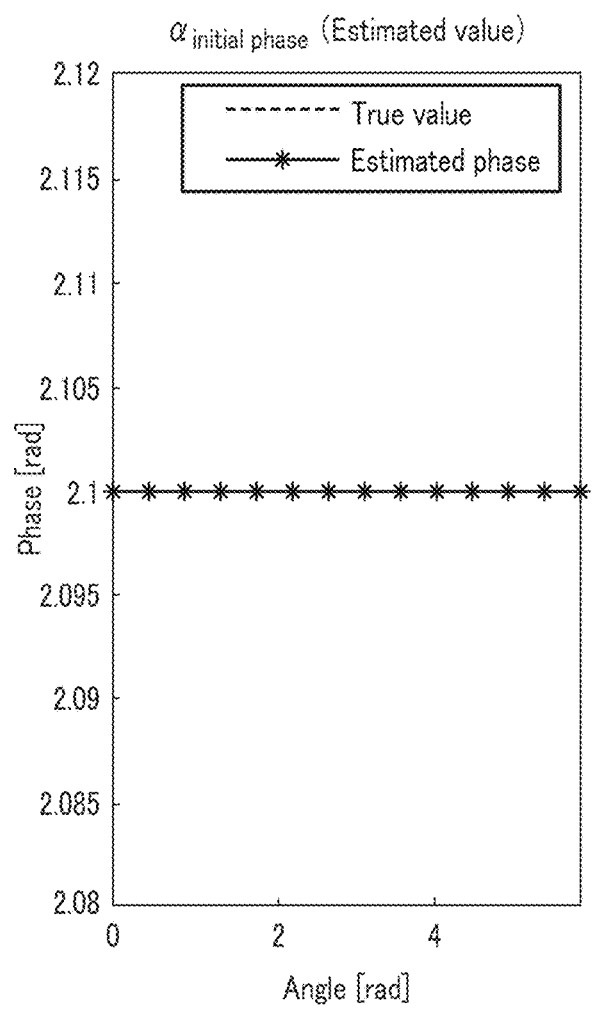
F I G. 13A            F I G. 13B

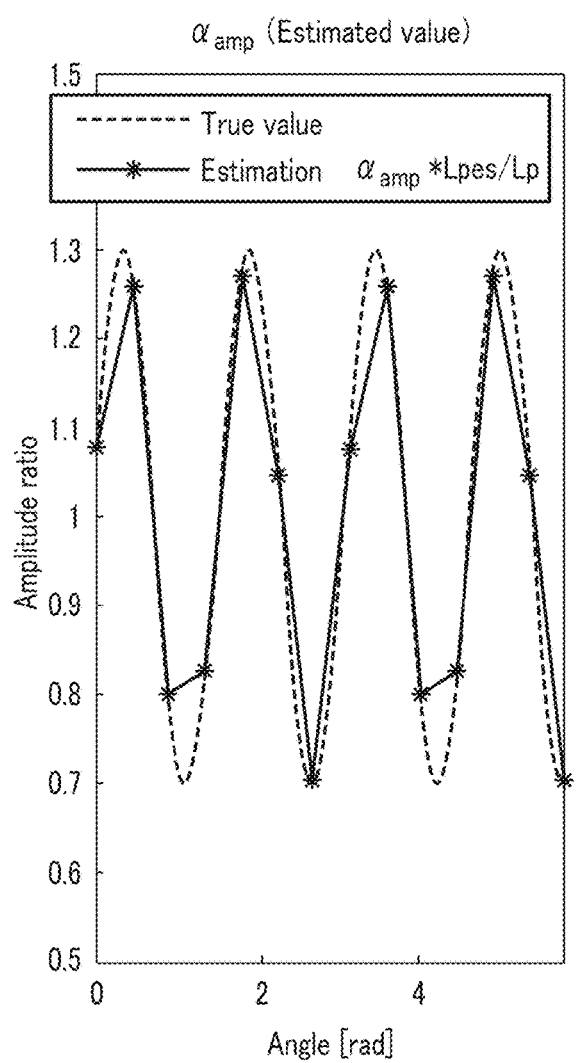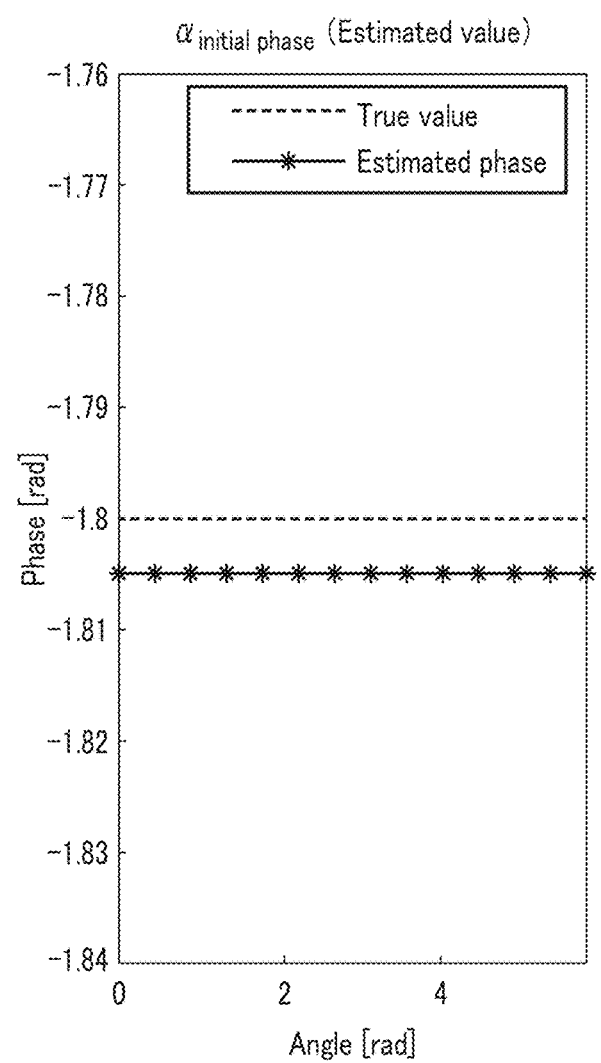
F I G. 14A            F I G. 14B

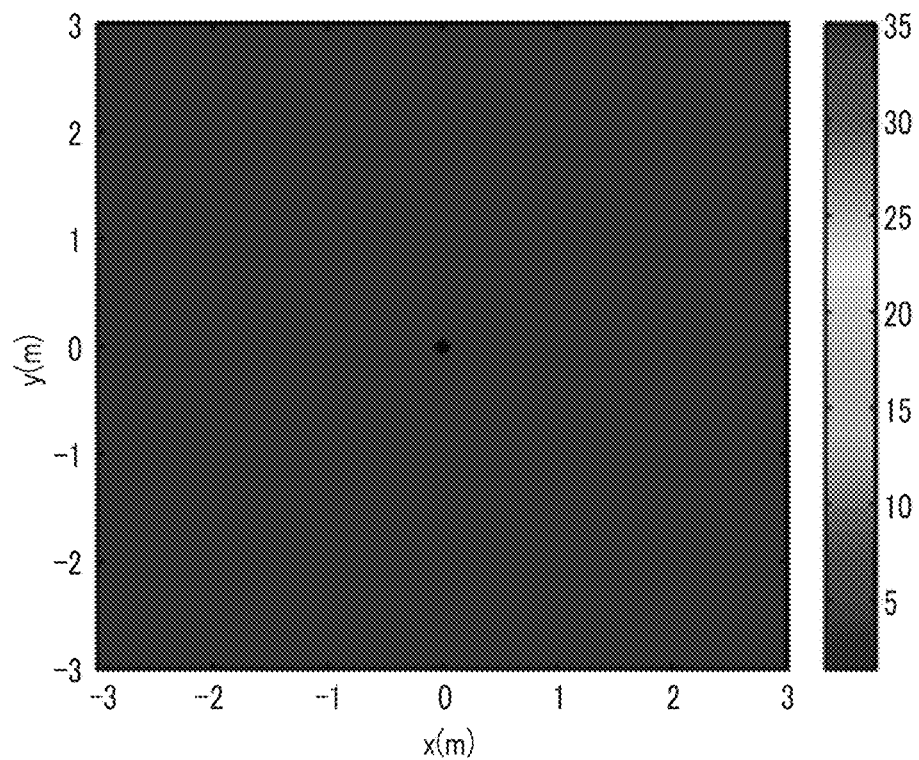
F I G. 15
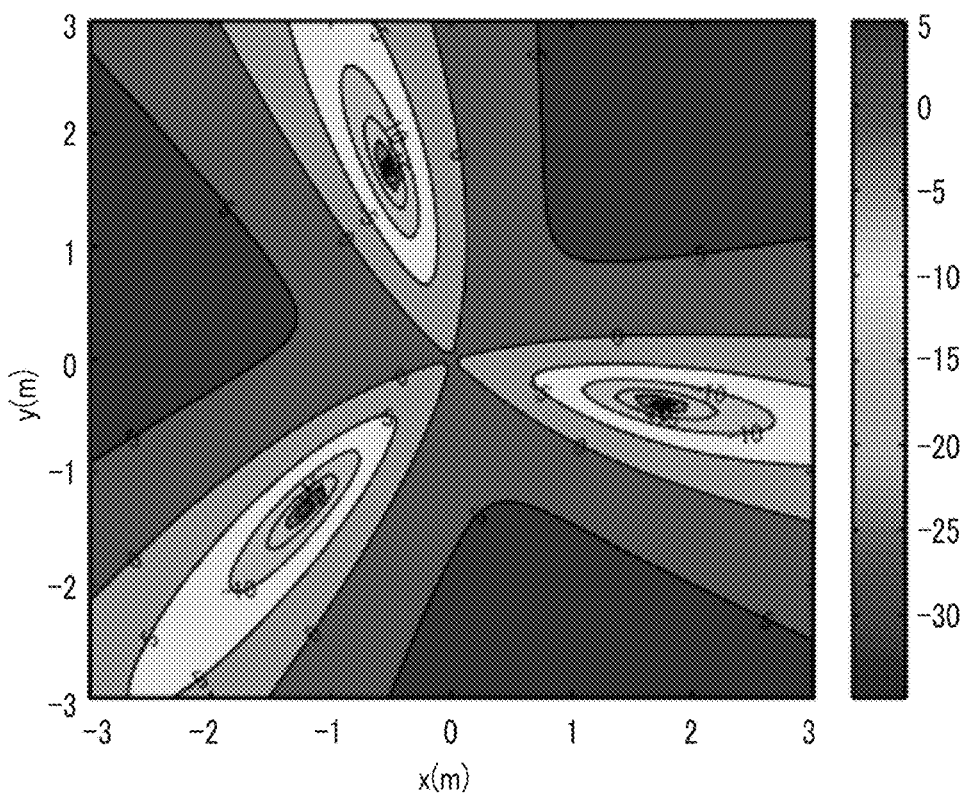
F I G. 16

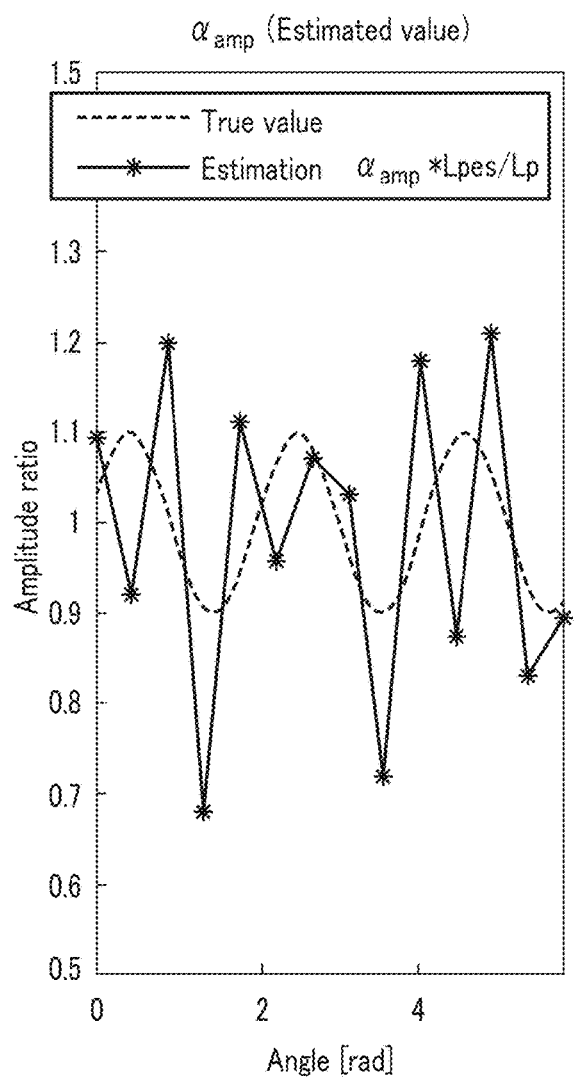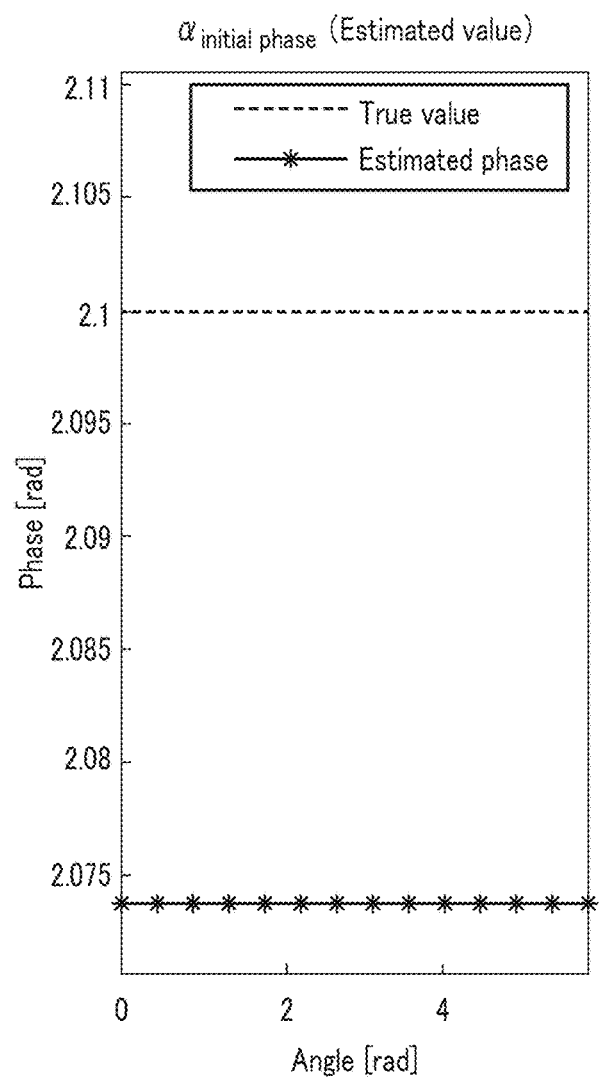
F I G. 20A          F I G. 20B

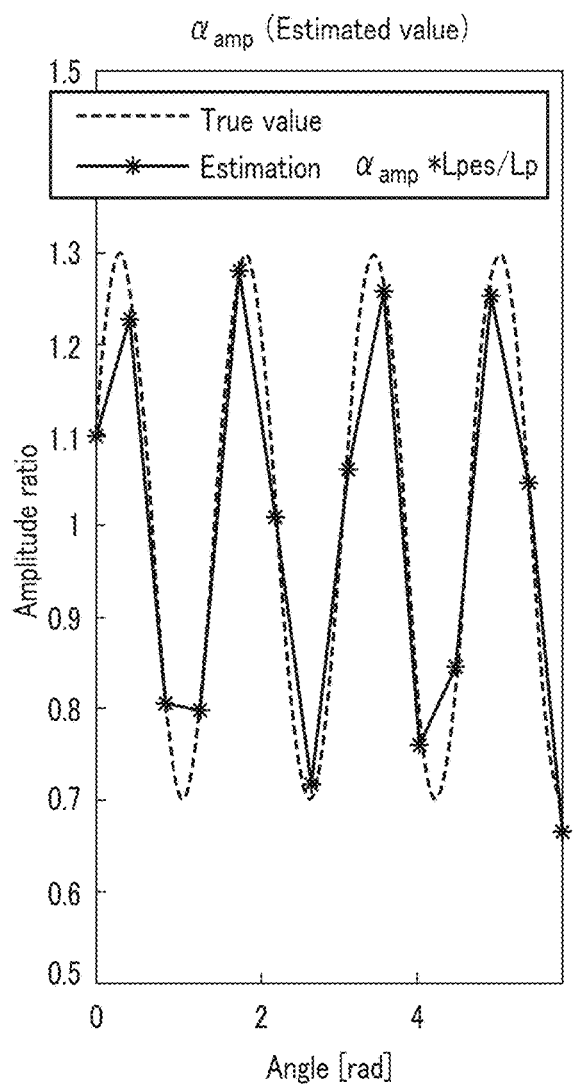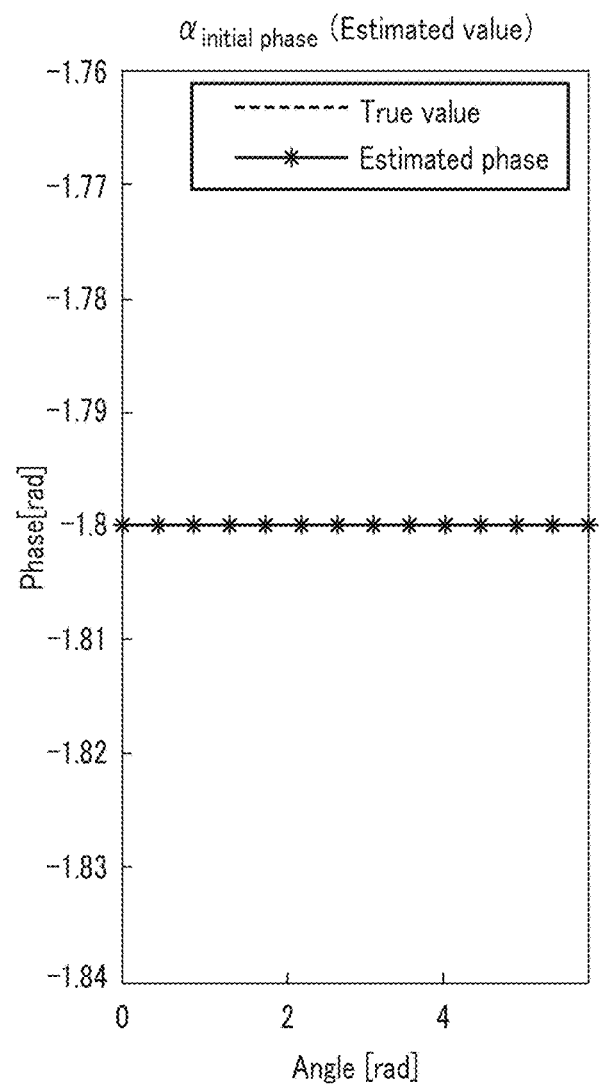
F I G. 21A                F I G. 21B

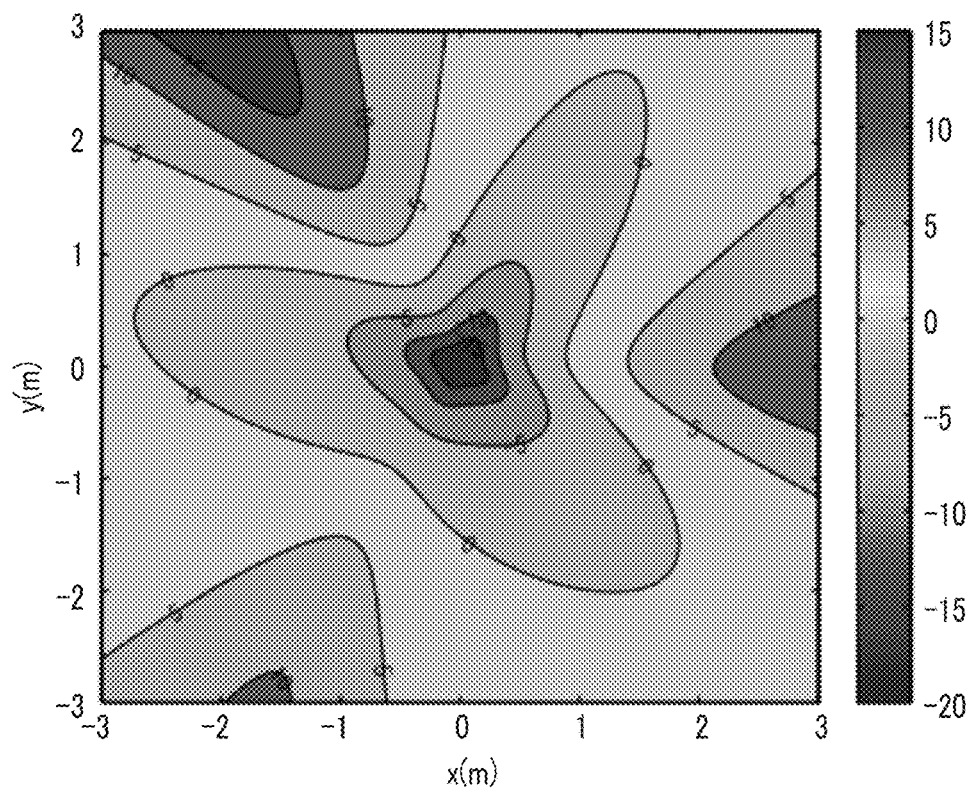
F I G. 22
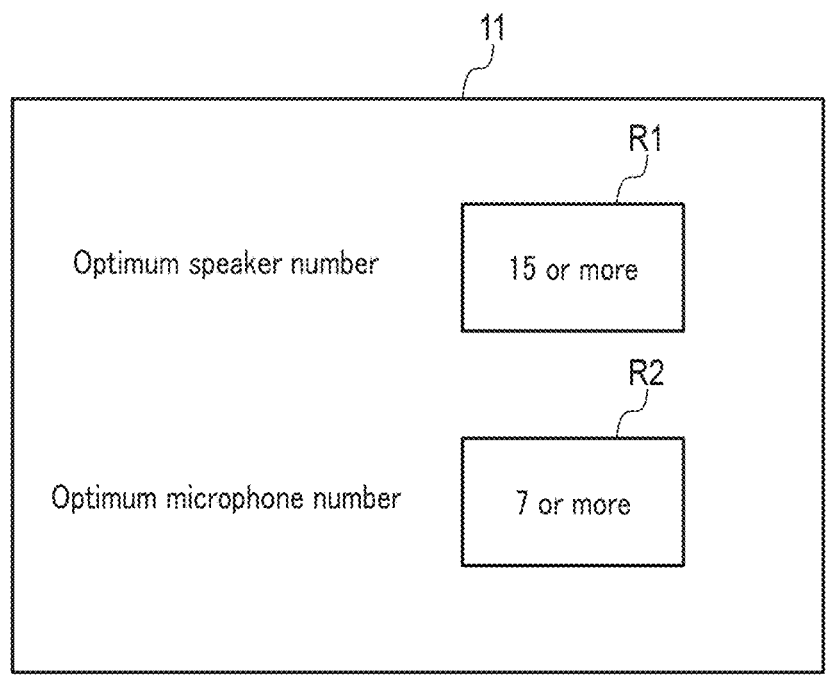
F I G. 23

NOISE REDUCTION DEVICE, FLIGHT VEHICLE, POWER GENERATION DEVICE, AND NOISE REDUCTION METHOD

CROSS-REFERENCE TO RELATED APPLICATIONS

This application is based upon and claims the benefit of priority from the Japanese Patent Application No. 2017-177472, filed Sep. 15, 2017 the entire contents of which are incorporated herein by reference.

FIELD

Embodiments described herein relate generally to a noise reduction device, a flight vehicle, a power generation device, and a noise reduction method.

BACKGROUND

The rotation of a rotor causes blade-tip noise. As a noise reduction technique, active noise control (ANC) has been well-known. The active noise control reduces noise by a speaker outputting control sound that has the same amplitude and the reverse phase relative to the noise. However, there is no established method of active noise control for blade-tip noise caused by the rotation of a rotor.

BRIEF DESCRIPTION OF THE DRAWINGS

FIG. 13A is a graph showing the estimation result of $\alpha_{amp}$ included in $W_i$ under the second simulation conditions according to the verification example 1.

FIG. 13B is a graph showing the estimation result of $\alpha_{initialphase}$ included in $W_i$ under the second simulation conditions according to the verification example 1.

FIG. 14A is a graph showing the estimation result of $\alpha_{amp}$ included in $W_i$ under the third simulation conditions according to the verification example 1.

FIG. 14B is a graph showing the estimation result of $\alpha_{initialphase}$ included in $W_i$ under the third simulation conditions according to the verification example 1.

FIG. 15 is a graph showing the acoustic power reduction amount in a sound pressure distribution at 3 meters above blades under the first simulation conditions according to the verification example 2.

FIG. 16 is a graph showing the acoustic power reduction amount at 3 meters above the blades under the second simulation conditions according to the verification example 2.

FIG. 20A is a graph showing the estimation result of $\alpha_{amp}$ included in $W_i$ under the second simulation conditions according to the comparative example.

FIG. 20B is a graph showing the estimation result of $\alpha_{initialphase}$ included in $W_i$ under the second simulation conditions according to the comparative example.

FIG. 21A is a graph showing the estimation result of $\alpha_{amp}$ included in $W_i$ under the third simulation conditions according to the comparative example.

FIG. 21B is a graph showing the estimation result of $\alpha_{initialphase}$ included in $W_i$ under the third simulation conditions according to the comparative example.

FIG. 22 is a graph showing the acoustic power reduction amount according to the comparative example.

FIG. 23 is a diagram showing an example of a display screen on which the optimum microphone number and the optimum speaker number are displayed by a display shown in FIG. 1.

DETAILED DESCRIPTION

A noise reduction device according to the present embodiment includes speakers, microphones, and a processing circuit. The speakers are arranged around a rotor and emit control sound based on control signals. The microphones are arranged around the rotor, and convert control sound and noise emitted from the rotor into microphone signals. The processing circuit produces control signals for reducing acoustic power in positions of the microphones, based on microphone signals, rotation speed of the rotor, and a phase of noise that reaches the microphones from the rotor.

Hereinafter, a noise reduction device, a flight vehicle, a power generation device, and a noise reduction method according to the present embodiment will be described with reference to the accompanying drawings.

A noise reduction device, a noise reduction method, and a noise reduction program according to the present embodiment perform active noise control for blade-tip noise of a rotor. The noise reduction device according to the present embodiment can be provided in any device incorporating a rotor. Examples of a device incorporating a rotor include a blower, a windmill, a flight vehicle, a power generation device, etc. Examples of a flight vehicle include an unmanned aircraft (drone) incorporating a rotor, a helicopter, etc. Examples of a power generation device include a wind power generator, a turbine, etc. Examples of a turbine include an air turbine, a water turbine, a steam turbine, a gas turbine, etc. The following description is based on the premise that the noise reduction device according to the present embodiment is provided in a blower.

Figure 1:
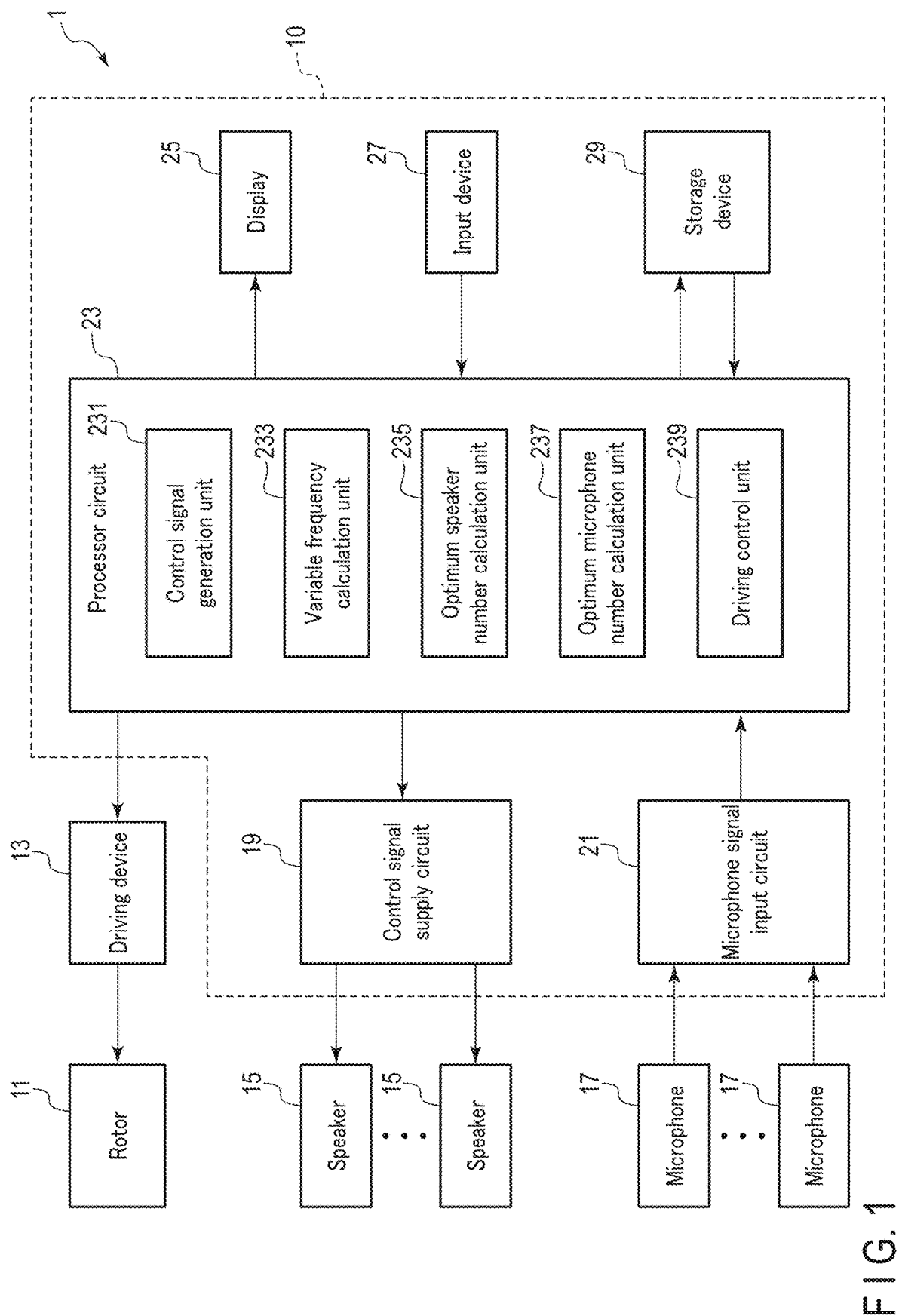
FIG. 1 is a diagram showing the configuration of a noise reduction device according to the present embodiment.

FIG. 1 is a diagram showing the configuration of a noise reduction device 1 according to the present embodiment. As shown in FIG. 1, the noise reduction device 1 includes a computer 10, a rotor 11, a driving device 13, a plurality of speakers 15, and a plurality of microphones 17 ("j" is an integer indicative of each number assigned to each microphone).

The rotor 11 includes a plurality of blades that are provided in a manner to be rotatable about a rotation axis. The rotor 11 rotates about the rotation axis upon receipt of power caused by the driving device 13 of the computer 10. The rotor 11 causes blade-tip noise by its rotation. The driving device 13 is realized by, for example, a motor, an actuator, etc. The driving device 13 and the computer 10 are connected to each other through wire or radio in a communicable way. The driving device 13 is driven in response to a rotation instruction from a processor circuit 23, thereby rotating the rotor 11 at rotation speed according to the rotation instruction.

The plurality of speakers 15 are arranged around the rotor 11. The speakers 15 emit control sound for reducing acoustic power in positions of microphones 17, based on control signals from the computer 10. The speakers 15 and the computer 10 are connected to each other through wire or radio in a communicable way. In the present embodiment, numbers respectively assigned to the speakers 15 are collectively presented by "k". The number of speakers 15, which is presented by "Lc", may be any number greater than or equal to 2.

The plurality of microphones 17 are arranged around the rotor 11. The microphones 17 collect control sound emitted from the speakers 15 and blade-tip noise emitted from the rotor 11, and accordingly convert the collected sound and noise into electrical signals. Hereinafter, electrical signals converted by the microphones 17 are referred to as microphone signals. The microphones 17 and the computer 10 are connected to each other through wire or radio in a communicable way. Microphone signals are supplied to the computer 10. In the present embodiment, numbers assigned to the microphones 17, respectively, are collectively presented by "j". The number Lp of microphones 17 may be any number greater than or equal to 2.

The computer 10 functions as a main component of the noise reduction device 1. The computer 10 includes a control signal supply circuit 19, a microphone signal input circuit 21, a processor circuit 23, a display 25, an input device 27, and a storage device 29. The control signal supply circuit 19, the microphone signal input circuit 21, the processor circuit 23, the display 25, the input device 27, and the storage device 29 are connected to each other through a bus, for example.

The control signal supply circuit 19 includes an interface to communicate with the plurality of speakers 15. For example, the control signal supply circuit 19 supplies control signals produced by the processor circuit 23, to the speakers 15 through wire or radio.

The microphone signal input circuit 21 includes an interface to communicate with the plurality of microphones 17. For example, the microphone signal input circuit 21 inputs, through wire or radio, microphone signals produced by the microphones 17. The microphone signal input circuit 21 may include a signal processing circuit that performs given signal processing such as amplification processing to a microphone signal.

The processor circuit 23 includes a processor such as a CPU (Central Processing Unit) and a memory such as an RAM (Random Access Memory). The processor circuit 23 executes programs stored in the storage device 29, thereby realizing a control signal generation unit 231, a variable frequency calculation unit 233, an optimum speaker number calculation unit 235, an optimum microphone number calculation unit 237, and a driving control unit 239.

The control signal generation unit 231 produces control signals for reducing acoustic power in positions of the microphones 17, based on microphone signals produced by the microphones 17, rotation speed of the rotor 11, and a phase of blade-tip noise (hereinafter referred to as a "noise phase") that reaches the microphones 17 from the rotor 11. Control signals are supplied to the speakers 15 through the control signal supply circuit 19.

The variable frequency calculation unit 233 estimates a variable frequency of a circumferential sound pressure distribution produced by the rotor 11, by means of autocorrelation processing based on microphone signals or a Fourier transform. The circumferential sound pressure distribution is a sound pressure distribution regarding blade-tip noise emitted from the rotor 11. Blade-tip noise emitted from the rotor 11 is propagated in a substantially isotropic manner with the rotation axis as a center. Thus, the noise pressure distribution regarding blade-tip noise emitted from the rotor 11 approximates a circumferential shape.

The optimum speaker number calculation unit 235 calculates the optimum number of speakers 15 for active noise control (hereinafter, referred to as an "optimum speaker number"), based on a variable frequency calculated by the variable frequency calculation unit 233 and the maximum value of control target order. In addition, the optimum speaker number calculation unit 235 is able to calculate the optimum speaker number based on a variable frequency of a circumferential sound pressure distribution formed by the rotor 11. A control target order is defined as an order of a processing target in processing of producing a control signal, out of a plurality of orders regarding a fundamental wave and a harmonic wave of blade-tip noise.

The optimum microphone number calculation unit 237 calculates the optimum number of microphones 17 for active noise control (hereinafter, referred to as an "optimum microphone number"), based on a variable frequency calculated by the variable frequency calculation unit 233.

The driving control unit 239 outputs a rotation instruction to the driving device 13 in order to rotate the rotor 11 at given rotation speed. Specifically, the driving control unit 239 supplies to the driving device 13 a driving pulse signal stream corresponding to target rotation speed. In response to the driving pulse signal stream, the driving device 13 rotates the rotor 11 at the target rotation speed.

The display 25 displays a variety of information. For example, the display 25 displays the optimum speaker number calculated by the optimum speaker number calculation unit 235 and the optimum microphone number calculated by the optimum microphone number calculation unit 237. For example, a CRT (Cathode-Ray Tube) display, a liquid crystal display, an organic EL (Electro Luminescence) display, an LED (Light-Emitting Diode) display, a plasma display, or any other displays known in this technical field can be appropriately utilized as the display 25.

The input device 27 inputs various instructions from a user. Specifically, a keyboard, a mouse, various types of switches, a touch pad, a touch panel display, etc. can be appropriately selected as the input device 27. An output signal from the input device 27 is supplied to the processor circuit 23. The input device 27 may be a computer that is connected to the processor circuit 23 through wire or radio.

The storage device 29 includes an ROM (Read Only Memory), an HDD (Hard Disk Drive), an SSD (Solid State Drive), an integrated circuit storage device, etc. The storage device 29 stores various results of computation performed by the processor circuit 23, and various programs to be executed by the processor circuit 23.

Hereinafter, the details of the noise reduction device according to the present embodiment will be described.

Figure 2:
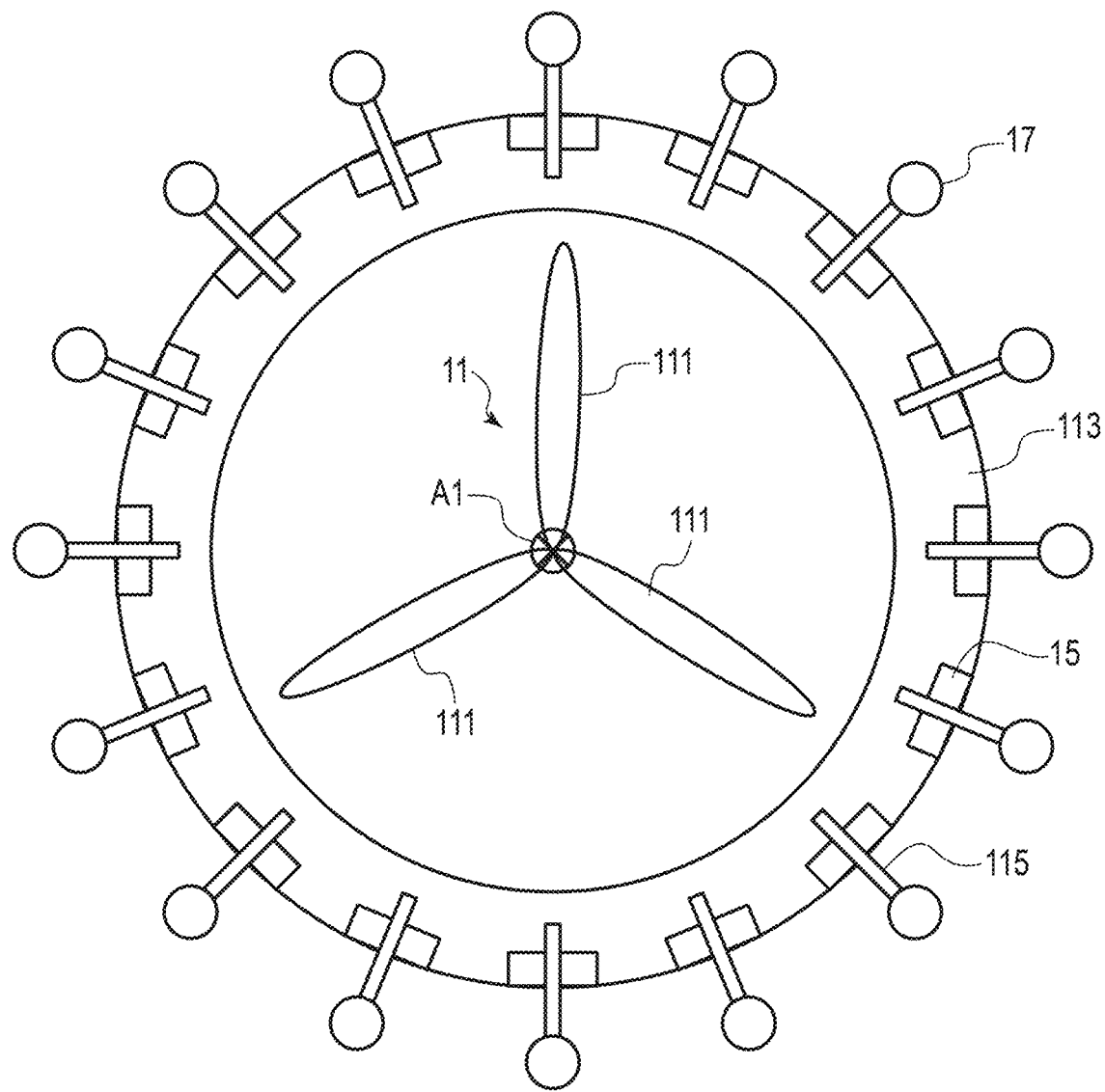
FIG. 2 is a view showing a position relationship between a rotor, speakers, and microphones shown in FIG. 1.

FIG. 2 is a view showing a position relationship between the rotor 11, the speakers 15, and the microphones 17. As shown in FIG. 2, the rotor 11 includes a plurality of blades 111 that rotate about a rotation axis A1. The rotation axis A1 is realized by a shaft that rotates upon receipt of power from the driving device 13 not shown in FIG. 2. The plurality of blades 111 are attached to this shaft. In FIG. 2, the rotor 11 includes three of the blades 111. However, the rotor 11 may include any number of the blades 111. When the blades 111 rotate around the rotation axis A1, noise (blade-tip noise) is emitted from the blades 111. A frame 113 formed in an annular shape is provided in a manner to surround the outer circumference of the rotor 11. The frame 113 is arranged in a manner that its center corresponds to the rotation axis A1. In order to not block airflow by the rotor 11, the frame 113 is preferably small in thickness along the rotation axis A1. On the other hand, in order to secure mechanical strength, etc., the frame 113 is preferably large in thickness along the rotation axis A1. That is, the frame 113 may have a cylindrical shape.

However, the shape of the frame 113 is not limited to an annular shape or a cylindrical shape only. For example, the frame 113 may have a polygonal cylindrical shape such as a square cylindrical shape. However, with the frame 113 in the annular shape or cylindrical shape, airflow caused by the rotation of the rotor 11 becomes axially symmetric about the rotation axis A1. Considering this, the frame 113 is preferably in an annular shape or a cylindrical shape.

As shown in FIG. 2, the frame 113 is provided with the plurality of speakers 15. For example, in order to prevent turbulence in flows of air and sound, caused by the rotation of the rotor 11, the speakers 15 are preferably buried in the frame 113. The plurality of speakers 15 are arranged at equal intervals on a circumference around the rotation axis A1 as a center. A distance between each of the speakers 15 and the rotation axis A1 substantially corresponds to the radius of the frame 113. A control effect of active noise control is further improved as a distance between each of the speakers 15 and the rotation axis A1 is more approximate to the radial length (blade radius) of each of the blades 111. Thus, the frame 113 and the blades 111 are designed in a manner that their radii substantially correspond to each other.

As shown in FIG. 2, the frame 113 is provided with the plurality of microphones 17. The plurality of microphones 17 are arranged at equal intervals on a circumference around the rotation axis A1 as a center. The microphones 17 are arranged in the vicinity of the speakers 15. Furthermore, the microphones 17 are preferably arranged in locations less influenced by wind caused by the rotation of the rotor 11. Thus, the microphones 17 are preferably provided in the outside in the radial direction of the frame 113. Specifically, a plurality of bar-shaped jigs 115, which respectively correspond to the plurality of microphones 17, are provided in the outer periphery of the frame 113 in a manner to project to the outside in the radial direction. For example, the jigs 115 are provided in positions of the frame 113, in which the speakers 15 are buried. The microphones 17 are attached to the distal ends of the jigs 115. In this manner, the microphones 17 can be arranged in the vicinity of the speakers 15. In order to eliminate the influence of wind by the rotor 11 from the microphones 17, it is more preferable that a windshield screen be provided between the rotor 11 and the microphones 17.

In FIG. 2, the speakers 15 and the microphones 17 are equal in number. However, the present embodiment is not limited to this. The speakers 15 and the microphones 17 may also be not equal in number.

A concept of minimizing acoustic power will be described next. Such minimization is made by a control signal generation unit 50 according to the present embodiment.

The control signal generation unit 50 according to the present embodiment generates a control signal, which is supplied to each of speakers 15-$k$ in order to perform active noise control over blade-tip noise of the rotor 11, according to acoustic simulations based on a microphone signal from each of microphones 17-$j$. The control signal causes each of speakers 15-$k$ to emit control sound for minimizing acoustic power in a position of each of microphones 17-$j$.

Figure 3:
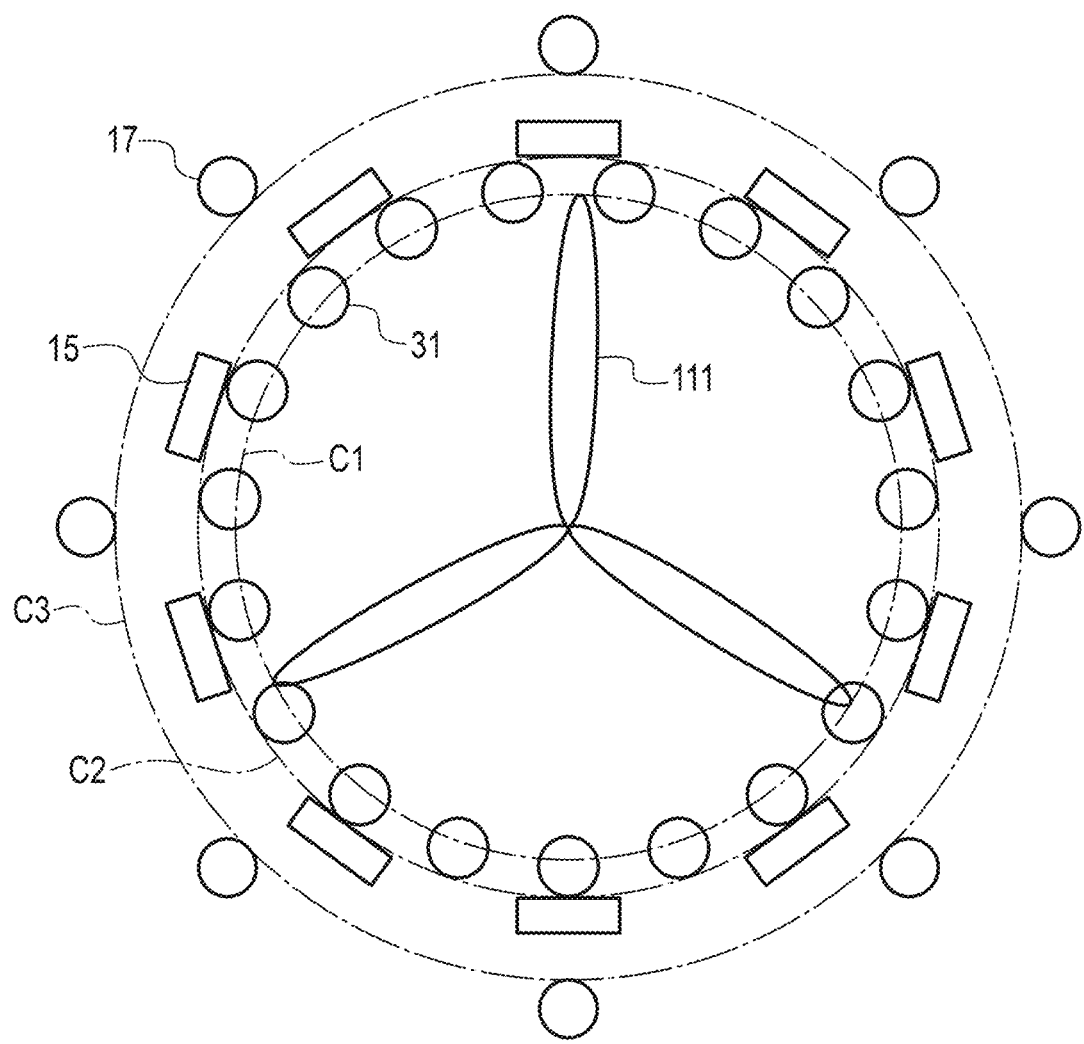
FIG. 3 is a view schematically showing simulation conditions of acoustic simulation by a control signal generation unit shown in FIG. 1.

FIG. 3 is a view schematically showing simulation conditions of acoustic simulation by the control signal generation unit 50. As shown in FIG. 3, blade-tip noise caused by the rotation of the rotor 11 is a rotation sound source. Thus, a plurality of main sound sources (blade-tip sound sources) 31 are set on a circumference C1 with a blade radius. Each of the main sound sources 31 simulates an occurrence location of blade-tip noise caused by the rotation of the rotor 11. The speakers 15 are arranged at equal intervals on a circumference C2 that is larger in radius than the circumference C1. The microphones 17 are arranged at equal intervals on a circumference C3 that is greater in radius than the circumference C2. The speakers 15 are referred to as control sound sources in acoustic simulation. Each of the control sound sources 15 simulates an occurrence location of control sound emitted from each of the speakers 15.

Since blade-tip noise is a rotation sound source, volume velocity $q_{pi}$ of the "i"th main sound source 31 (hereinafter, referred to as a "main sound source volume velocity") is generally expressed as in equation (1) below, while volume velocity $q_{sk}$ of the "k"th control sound source 15 (hereinafter, referred to as "control sound source volume velocity") is generally expressed as in equation (2) below. Assume that the estimated number of the main sound sources 31 is Lp, and the number of control sound sources 15 is Lc. In addition, M=Bx, in which B represents the number of the blades 111 of the rotor 11, and x presents control target orders related to a fundamental wave and a harmonic wave of blade-tip noise. Furthermore, Q represents rotation speed (rotation frequency) of the rotor 11.

$$q_{pi} = \alpha_i q_p, \alpha_i = e^{-iM\phi_i}, \phi_i = 2\pi i/Lp(i=0, \ldots, (Lp-1)) \quad (1)$$

$$q_{sk} = \beta_k q_s, \beta_k = e^{-iM\phi'_k}, \phi'_k = 2\pi j/Lc(k=0, \ldots, (Lc-1)) \quad (2)$$

As expressed in equation (1), main sound source volume velocity $q_{pi}$ of the "i"th main sound source 31 is expressed by a product of magnitude component $q_p$ of the main sound source volume velocity that is common among the main sound sources 31, and phase difference component $\alpha_i$ of the main sound source volume velocity of the "i"th main sound source 31. Blade-tip noise that reaches the microphones 17 from the blades 111 forming the rotor 11 has an amplitude that varies, even if it is constant at the blade tips of the blades 111, in a time-periodical manner along with a periodic change of a distance from the blade tips of the blades 111 to the microphones 17. Phase difference component $\alpha_i$ contains phase delay $\exp(-iM\phi_i)$ of the "i"th main sound source 31 (hereinafter, referred to as a "blade phase delay") that simulates blade-tip noise. A blade phase delay corresponds to a noise phase of blade-tip noise that reaches the microphones 17 from the rotor 11. As expressed in equation (2), control sound source volume velocity $q_{sk}$ of the "k"th main sound source 15 is represented by a product of magnitude component $q_s$ of the control sound source volume velocity that is common among the control sound sources 15 and phase difference component $\beta_k$ of the control sound source volume velocity of the "k"th control sound source 15. Phase difference component $\beta_k$ represents phase delay $\exp(-iM\phi'_k)$ of the "k"th control sound source 15.

However, an initial phase of the main sound source 31, that is, a phase angle of $q_p$ is unclear. As expressed in equations (3) and (4) below, in the following expressions, $q_p = \exp(iM\Omega t)$, and initial phase $\alpha_{initialphase}$ is generalized into $\alpha_i$. The aforementioned expressions are based on the premise that blade-tip noise is constant (axially symmetric) on the same circumference C1. Since blade-tip noise depends on an installation environment of the blades 111, this noise may not be axially symmetric in an actual situation. Amplitude ratio $\alpha_{amp-i}$ of blade-tip noise on the circumference C1 is also generalized into $\alpha_i$. That is, as expressed in equation (4), phase difference component $\alpha_i$ is defined by a product of a blade phase delay, an initial phase, and an amplitude ratio. Amplitude ratio $\alpha_{amp-i}$ is defined by a ratio of an amplitude of blade-tip noise of target phase i to an amplitude of blade-tip noise of a reference phase on the circumference C1. In the case of blade-tip noise being axially symmetric, amplitude ratio $\alpha_{amp-i}$ is equal to 1.

$$q_{pi} = \alpha_i q_p (i=0, \ldots, (Lp-1)) \quad (3)$$

$$\alpha_i = e^{-iM\phi_i} e^{I\alpha_{initialphase}} \alpha_{amp-i}(i=0, \ldots, (Lp-1)) \quad (4)$$

Since amplitude ratio $\beta_{amp}$, is included in $\beta_k$, $\beta_k$ is also changed as in equations (5) and (6) below. Amplitude ratio $\beta_{amp-i}$ is defined by a ratio of an amplitude of blade-tip noise of target phase i to an amplitude of blade-tip noise of a reference phase on the circumference C2 on which the control sound sources are arranged. In the case of blade-tip noise being axially symmetric, amplitude ratio $\beta_{amp-i}$ is equal to 1. Phase difference component $\beta_k$ is defined by a product of a phase delay and an amplitude ratio, as in equation (6).

$$q_{sk} = \beta_k q_s (k=0, \ldots, (Lc-1)) \quad (5)$$

$$\beta_k = e^{-iM\phi'_k} \beta_{amp-k}(k=0, \ldots, (Lc-1)) \quad (6)$$

Acoustic power W is expressed by equations (7) to (12) below. Control sound source volume velocity $q_s$ of a minimization target is expressed by equation (8) below. Herein, $k = \omega/c$ is a wavenumber, and $\omega$ is defined to be $\omega = M\Omega$.

$$W = \frac{\omega \rho_0 k}{8\pi} \text{Re}\{Aq_s q_s^* + Bq_p^* q_s + Cq_p q_s^* + D\} \quad (7)$$

$$q_s = -\frac{C}{A} q_p \quad (8)$$

$$A = \sum_{i=1}^{Lc} \sum_{j=1}^{Lc} \beta_i \beta_j^* \text{sinc}(kd_{s_i s_j}) \quad (9)$$

$$B = \sum_{i=1}^{Lc} \sum_{j=1}^{Lc} \beta_i \alpha_j^* \text{sinc}(kd_{s_i p_j}) \quad (10)$$

$$C = \sum_{i=1}^{Lc} \sum_{j=1}^{Lc} \alpha_i \beta_j^* \text{sinc}(kd_{p_i s_j}) \quad (11)$$

$$D = \sum_{i=1}^{Lc} \sum_{j=1}^{Lc} \alpha_i \alpha_j^* \text{sinc}(kd_{p_i p_j}) \quad (12)$$

As described above, conventional computation of control sound source volume velocity $q_s$ in which acoustic power W is optimized uses a predetermined value because an actual main sound source volume velocity $q_p$ is unknown. Thus, the technique for minimizing acoustic power W, although this is useful for prior evaluation of active noise control effect, has not been available for real-time active noise control in an actual situation.

The control signal generation unit 50 according to the present embodiment estimates the main sound source volume velocity based on microphone signals from a plurality of microphones 17-j, and directly derives the control sound source volume velocity for minimizing acoustic power, based on the main sound source volume velocity. Specifically, the plurality of microphones 17-j are arranged at a known angle around the rotor 11 (specifically, at equal intervals). The control signal generation unit 50 constructs a transmission characteristic model of sound that is propagated from the plurality of blade-tip noise sources to each of microphones 17-j, and estimates the main sound source volume velocity by incorporating a microphone signal from each of microphones 17-j into the transmission characteristic model. With the technique according to the present embodiment, not only amplitude ratio $\alpha_{amp-i}$, but also relative phase angle $\alpha_{initialphase}$ from a reference phase can be derived. This makes it possible to directly derive control sound source volume velocity $q_s$ for minimizing acoustic power. Thus, a higher control performance can be obtained as compared to indirect active noise control that is performed by reducing error microphone sound pressure.

Described hereinafter is the technique for the control signal generation unit 50 according to the present embodiment to estimate main sound source volume velocity $q_p$.

Assume that the number of microphones used for estimation is Lm, and the number of main sound sources used for estimation is Lpes. Since the actual number Lp of the main sound sources is unknown, this number is set to Lpes as appropriate. Each of the main sound sources used for estimation is assumed to be arranged on the blade radius. A transmission characteristic obtained by multiplying path characteristic $C'_{ij}$ from each position i (i=1, ..., Lpes) of a main sound source used for estimation to each microphone j (j=1, ..., Lm) by blade phase delay exp(-iMφ'$_i$) is set to C$_{ij}$(t)=C$_{ij0}$(t)+C$_{ij1}$(t)i, and a microphone signal obtained by each microphone is set to m$_j$(j=1 ... Lm). Assume that Φ$_i$=2πi/Lpes (i=0, ..., Lpes-1). Herein, path characteristic C$_{ij}$(t) changes over time because of selection of a transmission characteristic corresponding to frequency MΩ obtained by multiplying rotation speed Ω by control target order x and B as the number of blades based on path characteristic C'$_{ij}$. However, in the case of rotation speed Ω being constant, path characteristic C$_{ij}$(t) takes a fixed value without changing over time. Microphone signal m$_j$ at the time of active noise control is set to a signal after subtraction of the influence of control sound. Herein, microphone signal m$_j$ after subtraction of the influence of control sound is referred to as post-processing microphone signal m$_j$, whereas microphone signal m$_j$ without subtraction of the influence of control sound is referred to as original microphone signal m$_j$. Post-removal microphone signal m$_j$(t) of the "j"th microphone is expressed by equation (13) below, based on original microphone signal mr$_j$(t) of the "j"th microphone, transmission characteristic T$_{kj}$ of sound from the "k"th speaker to the "j"th microphone, and input u$_k$ to each speaker.

$$m_j(t) = mr_j(t) - \sum_{k=1}^{Lc} T_{kj}u_k \tag{13}$$

Figure 4:
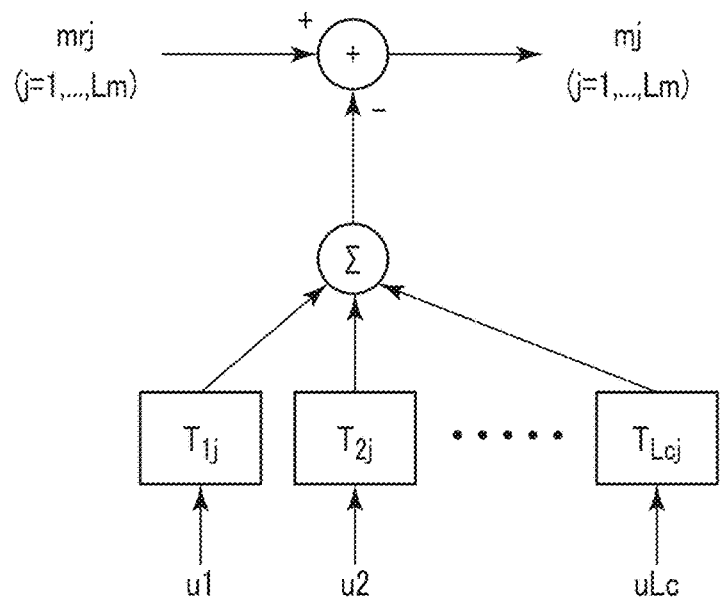
FIG. 4 is a diagram schematically showing equation (13) according to the present embodiment.

FIG. 4 is a diagram schematically showing equation (13). As shown in FIG. 4, post-removal microphone signal m$_j$(t) is obtained by subtracting sum Σ of a control sound that is emitted from each speaker k and reaches the "j"th microphone, from original microphone signal mr$_j$(t) of the "j"th microphone. The control sound that is emitted from each speaker k and reaches the "j"th microphone is defined by product T$_{kj}$u$_k$ of transmission characteristic T$_{kj}$ and input u$_k$ to each speaker. Sum Σ is calculated by adding up products T$_{kj}$u$_k$ for all k. That is, post-removal microphone signal m$_j$(t) is generated by removing a signal component of the control sound from original microphone signal mr$_j$(t) based on transmission characteristic T$_{kj}$ of the sound from each speaker k to microphone j and an input signal to each speaker k. Post-removal microphone signal m$_j$(t) is generated by the microphone signal input circuit 21, for example.

Estimation parameter is w$_i$=e$^{iαinitialphase}$α$_{amp-i}$ (i=1, ..., L$_{pes}$), as a component included in α$_i$ other than a blade phase delay. Regarding estimation parameter w$_i$, a real unit is set to w$_{i0}$, and an imaginary unit is set to -w$_{i1}$. An estimation parameter is calculated by w$_i$=w$_{i0}$+(-w$_{i1}$)i.

Evaluation function J(t) is expressed by equations (14) to (17) below. Herein, X1=cos(ωt), X2=sin(ωt), and ωt=MΩ. Estimation parameter w$_i$ by which evaluation function J(t) is minimized is calculated.

$$J(t) = \sum_{j=1}^{Lm} e_j(t)^2 + \sum_{i=1}^{Lpes} im_i(t)^2 \tag{14}$$

$$e_j(t) = m_j(t) + \sum_{i=1}^{Lpes} \{C_{ij}(\omega_{i0}X_1 + \omega_{i1}X_2)\} \tag{15}$$

$$\simeq m_j(t) + \sum_{i=1}^{Lpes} \{\omega_{i0}(t)r_{ij0}(t) + \omega_{i1}(t)r_{ij1}(t)\} \tag{16}$$

$$im_i(t) = \text{Im}\{\omega_i(t)/\omega_{Lpes}(t)\} \tag{17}$$
$$= (\omega_{i1}(t)\omega_{Lpes0}(t) - \omega_{i0}(t)\omega_{Lpes1}(t))/$$
$$(\omega_{Lpes0}(t)^2 + \omega_{Lpes1}(t)^2)$$

Figure 5:
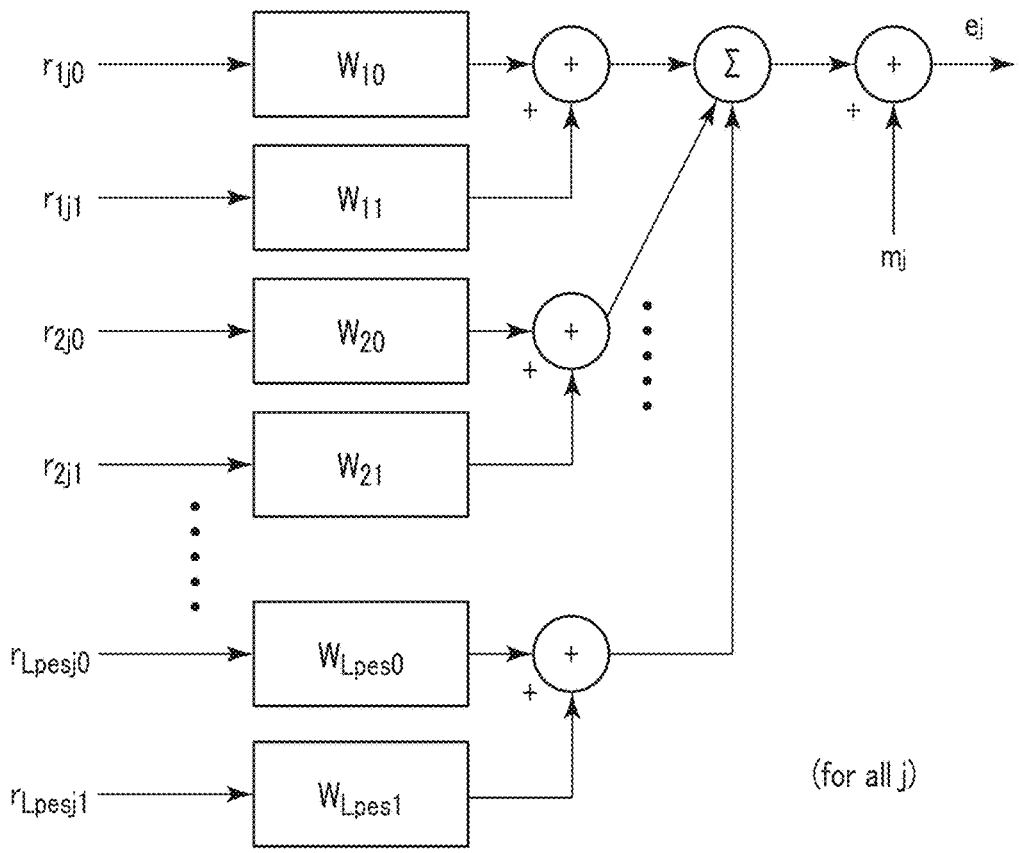
FIG. 5 is a diagram schematically showing equation (16) according to the present embodiment.

FIG. 5 is a diagram schematically showing equation (16). As shown in FIG. 5 and equation (16), a sum of a product of auxiliary variables r$_{ij0}$ and W$_{i0}$, and a product of auxiliary variables r$_{ij1}$ and W$_{i1}$ is calculated for each of all positions i. Then the sums of these products for all positions i are added up to calculate addition value Σ. Next, value e$_j$ to be included in the first term of the evaluation function is calculated by adding addition value Σ and post-processing microphone signal m$_j$. Value e$_j$ is calculated for each j from 1 to Lm.

Herein, auxiliary variable r$_{ij0}$ is expressed by equation (18) below, and auxiliary variable r$_{ij1}$ is expressed by equation (19) below.

$$r_{ij0}(t) = C_{ij0}(t)X_1 - C_{ij1}(t)X_2 \tag{18}$$

$$r_{ij1}(t) = C_{ij1}(t)X_1 - C_{ij0}(t)X_2 \tag{19}$$

Figure 6:
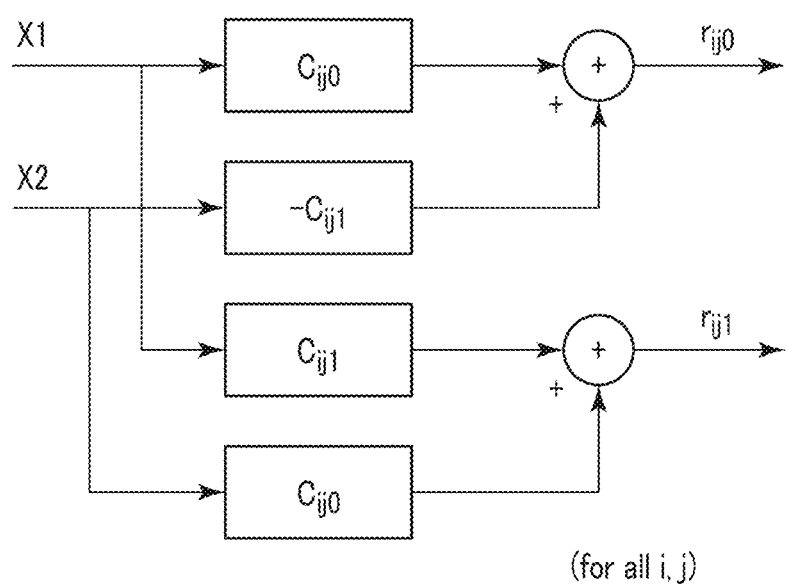
FIG. 6 is a diagram schematically showing equations (18) and (19) according to the present embodiment.

FIG. 6 is a diagram schematically showing equations (18) and (19). As shown in FIG. 6, and equations (18) and (19), auxiliary variable r$_{ij0}$ is calculated by adding up a product of X1 and C$_{ij0}$ and a product of X2 and (-C$_{ij1}$). Auxiliary variable r$_{ij1}$ is calculated by adding up a product of X1 and C$_{ij1}$ and a product of X2 and C$_{ij0}$. Auxiliary variable r$_{ij0}$ and auxiliary variable r$_{ij1}$ are calculated for each i from 1 to L$_{pes}$ and each j from 1 to Lm.

An update equation for minimizing evaluation function J(t) shown in equation (14) is expressed by equations (20) and (21) below. Herein, μ and μ2 are suitable step-size parameters.

$$\omega_{i0}(t+1) = \tag{20}$$
$$\omega_{i0}(t) - 2 \times \mu \sum_{j=1}^{Lm} \{r_{ij0}(t)e_j(t)\}/\|r_{i0}\|_2^2 + 2\mu_2 \times im_i(t) \times \omega_{Lpes1}(t)$$

$$\omega_{i1}(t+1) = \tag{21}$$
$$\omega_{i1}(t) - 2 \times \mu \sum_{j=1}^{Lm} \{r_{ij1}(t)e_j(t)\}/\|r_{i1}\|_2^2 - 2\mu_2 \times im_i(t) \times \omega_{Lpes0}(t)$$

In the second terms of update equations (20) and (21), $\|r_{i0}\|_2^2$ is a norm of vectors with Lm pieces of r$_{i0}$ arranged, and $\|r_{i1}\|_2^2$ is a norm of vectors with Lm pieces of r$_{i1}$ arranged. The second terms of update equations (20) and (21) are introduced to stabilize these equations; however, this is not a limitation.

A signal processing block including equations (16) to (21) above is referred to as a main sound source volume velocity estimator (α estimator). Herein, the first term of evaluation function J(t) in equation (14) represents a difference between a microphone signal and a computational microphone signal regarding noise that reaches a microphone from a main sound source estimated from a transmission characteristic. That is, the first term represents an evaluation value indicative of a difference between a product of incoming sound waves from an estimated main sound source position and an obtained microphone value. The second term of evaluation function J(t) represents a constrained condition for limiting a phase difference of the main sound source volume velocity to only a rotation delay by the rotor. Specifically, the constrained condition of the second term makes a deflection angle of each estimation parameter wi uniform.

Next, the control signal generation unit 231 according to the present embodiment will be described in terms of its configuration and processing.

Figure 7:
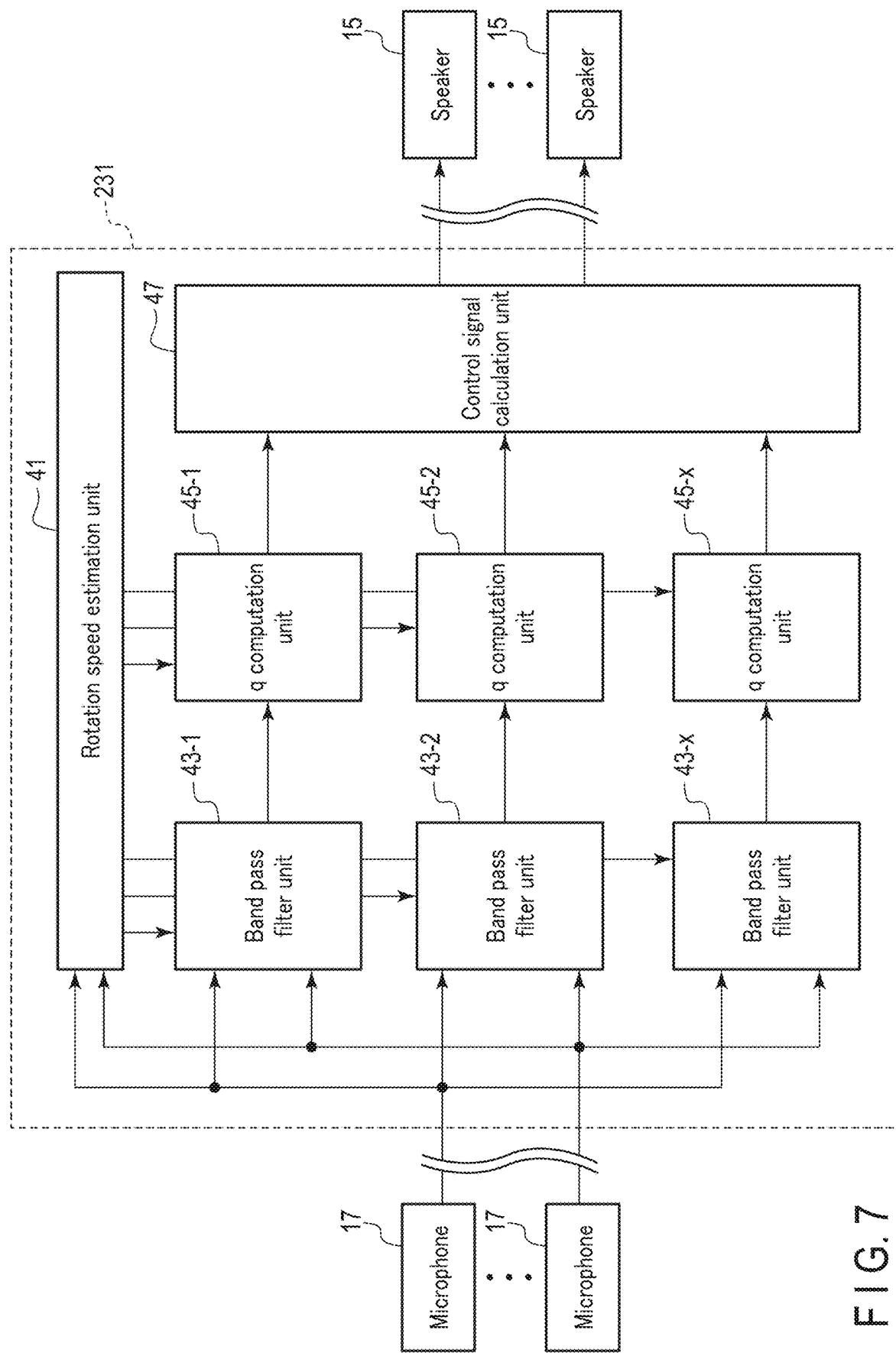
FIG. 7 is a diagram showing the configuration of the control signal generation unit shown in FIG. 1.

FIG. 7 is a diagram showing the configuration of the control signal generation unit 231 according to the present embodiment. As shown in FIG. 7, the control signal generation unit 231 includes a rotation speed estimation unit 41, a bandpass filter unit 43, a q computation unit 45, and a control signal calculation unit 47.

The rotation speed estimation unit 41 estimates rotation speed of the rotor 11 based on frequency analysis of post-removal microphone signal $m_j$. Specifically, the rotation speed estimation unit 41 specifies a peak value by performing frequency analysis such as FFT (Fast Fourier Transfer) to post-removal microphone signal $m_j$ from each of microphones 17-$j$. The rotation speed estimation unit 41 specifies the lowest frequency of frequencies corresponding to the specified peak value. The lowest frequency corresponds to order x=1. The lowest frequency is calculated for each of microphone signals $m_j$ from plural microphones 17-$j$. The rotation speed estimation unit 41 calculates an average value of the lowest frequencies, and calculates rotation speed $\Omega$ by dividing this average value by B as the number of blades 111. Rotation speed $\Omega$ is deemed as the rotation speed of the rotor 11.

A method of estimating rotation speed $\Omega$ is not limited to only a method using post-removal microphone signal $m_j$. For example, the rotation speed estimation unit 41 may estimate the rotation speed of the rotor 11 based on an output signal from a rotation detector that detects rotation of the rotor 11, or an output signal from a current detector that detects current to a power source for rotating the rotor 11. For example, an output signal from an encoder mounted on the rotor 11, or an output signal from a pulse counter for detecting passage of the blade 111 is used as an output signal from the rotation detector. As a method using an output signal from a current detector, for example, a current frequency is calculated from a current value detected by the current sensor, and rotation speed of the rotor 11 is estimated based on the current frequency.

The bandpass filter unit 43 is provided for each order x of a harmonic wave. Each of the bandpass filter units 43-$x$ generates post-processing microphone signal $m_{jx}$ by performing band-pass filtering, which is to select a frequency band component corresponding to control target order x, to post-removal microphone signal $m_j$ from the microphone 17. That is, the bandpass filter unit 43 applies parallel bandpass filtering to orders regarding a harmonic wave, the bandpass filters respectively corresponding to the orders. In this matter, the bandpass filter unit 43 outputs a post-processing microphone signal for each of the orders. A frequency band as a selection target is determined based on rotation speed $\Omega$. For example, a frequency band as a selection target is set in a manner to have a central frequency of Bx$\Omega$ and a bandwidth of 50 Hz.

The q computation unit 45 is provided for each order x of a harmonic wave. Each q computation unit 45-$x$ calculates control sound source volume velocity $q_{sx}$ based on post-processing microphone signal $m_{jx}$, rotation speed $\Omega$, and a noise phase that reaches each of microphones 17-$j$.

The control signal calculation unit 47 calculates control signal $u_j$ to each speaker based on plural control sound source volume velocitys $q_{sx}$ regarding plural orders x. Specifically, the control signal calculation unit 47 calculates volume velocity $q_{skx}$ to be given to each speaker based on control sound source volume velocity $q_{sx}$ and control sound source volume velocity phase difference $\beta_{kx}$, with respect to each of orders x. Volume velocity $q_{sk}$ is defined by a product of control sound source volume velocity $q_{sx}$ and control sound source volume velocity phase difference $\beta_{kx}$, that is, defined to be $q_{skx}=q_{sx}\beta_{kx}$. Control signal $u_{jx}$ to each speaker with respect to order x is defined by equation (22) below. That is, the control signal calculation unit 47 generates control signal $u_{jx}$ by extracting a real unit from $q_{skx}$. Control signal $u_{jx}$ is generated for each j from 1 to Lc. As presented in equation (23) below, the control signal calculation unit 47 calculates control signal $u_{jx}$ to each speaker by adding up control signals $u_{jx}$ regarding all the orders included in control target order group Xm.

$$u_{jx} = \text{Re}\{q_{skx}\}, \quad (j=1, \ldots, Lc) \tag{22}$$

$$u_j = \sum_{x \in X_m} u_{jx} \tag{23}$$

Next, the configuration and processing of the q computation unit 45 will be described in two cases: where amplitude ratio $\beta_{amp-k}$ is not included in the control sound source volume velocity (the configuration example 1) and where amplitude ratio $\beta_{amp-k}$ is included in the control sound source volume velocity (the configuration example 2).

Figure 8:
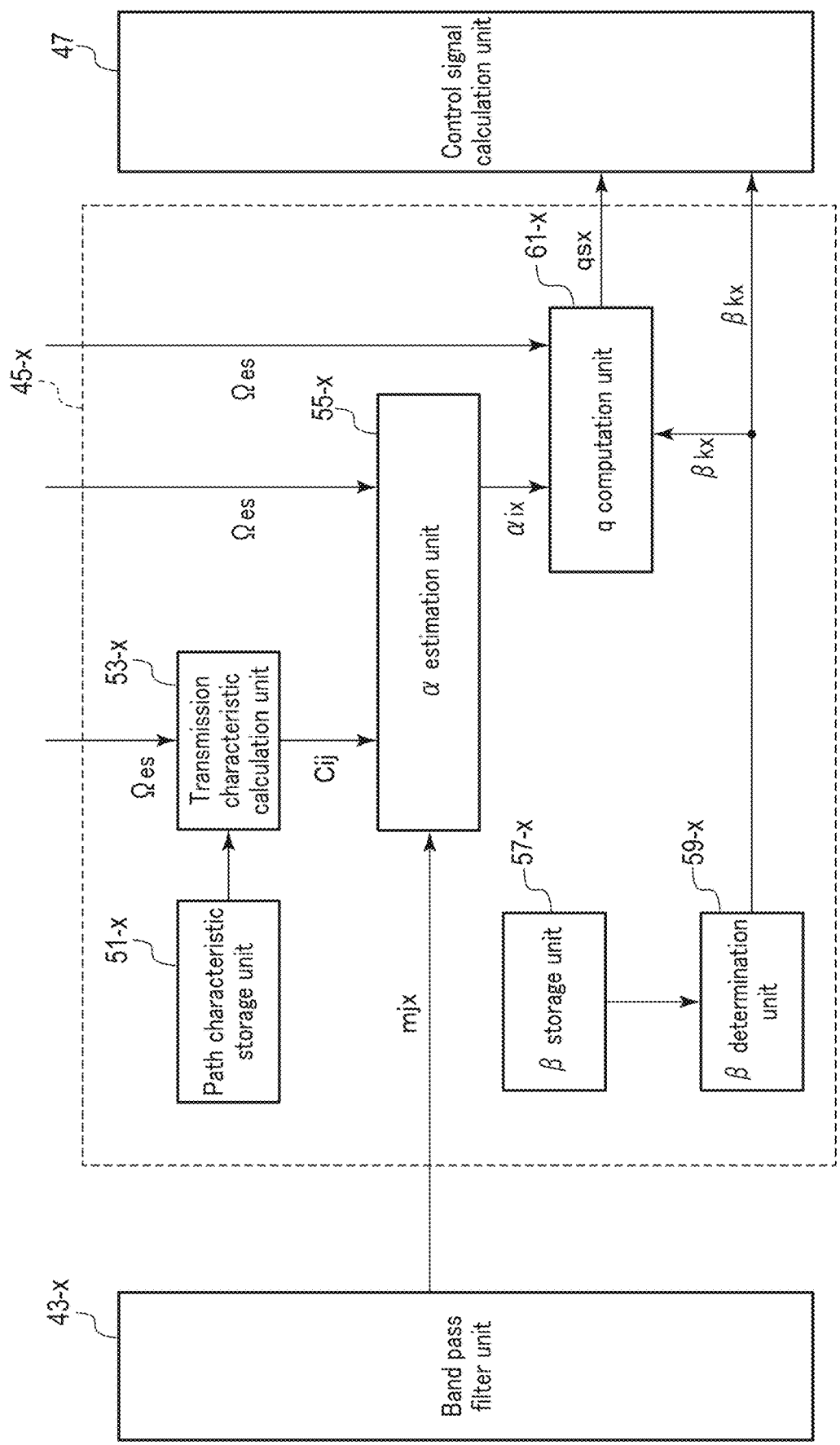
FIG. 8 is a diagram showing the configuration of a q computation unit regarding order x according to the configuration example 1.

FIG. 8 is a diagram showing the configuration of each q computation unit 45-$x$ regarding order x according to the configuration example 1. As shown in FIG. 8, each q computation unit 45-$x$ includes a path characteristic storage unit 51-$x$, a transmission characteristic calculation unit 53-$x$, an $\alpha$ estimation unit 55-$x$, a $\beta$ storage unit 57-$x$, a $\beta$ determination unit 59-$x$, and a q computation unit 61-$x$.

The path characteristic storage unit 51-$x$ is a database that stores a path characteristic of sound from each position i (i=1, ..., Lpes) of a main sound source to each microphone j (J=1, ..., Lm). A path characteristic can be obtained by a method using predictive calculation and a method by measurement. According to the method using predictive calculation, a path characteristic is determined by predictive calculation according to acoustic analysis based on an installation environment of the rotor 11 and a position relationship between the plurality of blades 111 that form the rotor 11. Since positions of the main sound sources and the microphones are known, acoustic analysis is performed in consideration of an installation environment of the rotor 11. According to the method by measurement, a path characteristic is determined based on path-measurement-dedicated microphone signals regarding path-measurement-dedicated sound that is emitted from path-measurement-dedicated speakers arranged in positions of the main sound sources and is collected by the microphones 17. An assumed form for storage is a microphone signal after having frequency analysis such as FFT.

The transmission characteristic calculation unit 53-$x$ determines a transmission characteristic by predictive calculation based on an installation environment of the rotor 11 and a position relationship between the plurality of blades 111 that form the rotor 11. Specifically, the transmission characteristic calculation unit 53-$x$ calculates product $\Omega_{es}$Bx of rotation speed $\Omega_{es}$, which is estimated by the rotation speed estimation unit 41, and Bx. The transmission characteristic calculation unit 53-$x$ then selects a path characteristic corresponding to frequency $\Omega_{es}$BX from the path characteristic storage unit 51-$x$. The transmission characteristic calculation unit 53-$x$ multiplies the selected path characteristic by blade phase delay $\exp(-iM\varphi_i)$, thereby calculating transmission characteristic $C_{ij}(t)=C_{ij0}(t)+C_{ij1}(t)i$. Blade phase delay $\exp(-iM\varphi_i)$ is calculated in advance based on M and $\varphi_i$. As stated above, M is defined by a product of B as the number of the blades 111 forming the rotor 11 and control target order x. As in equation (1), $\Phi_i$ is defined by $2\pi i/Lp$.

The $\alpha$ estimation unit 55-x estimates main sound source volume velocity $\alpha_{ix}$ based on post-processing microphone signal $m_{jx}$, rotation speed $\Omega_{es}$, blade phase delay $\exp(-iM\varphi_i)$, and transmission characteristic $C_{ij}(t)$. Specifically, the $\alpha$ estimation unit 55-x sets $X1=\cos(\omega t)$ and $X2=\sin(\omega t)$ based on rotation speed $\Omega_{es}$ estimated by the rotation speed estimation unit 41 using equations (16) to (21) above, and calculates estimation parameter $w_i = -e^{i\alpha_{initialphase}}\alpha_{amp-i}$ ($i=1, \ldots, L_{pes}$) based on transmission characteristic $C_{ij}(t)$ calculated by the transmission characteristic calculation unit 53-x and post-processing microphone signal $m_{jx}$ from the bandpass filter unit 43-x. The $\alpha$ estimation unit 55-x calculates main sound source volume velocity $\alpha_{ix} = -(\exp(-iM\varphi_i))w_i$ based on estimation parameter $w_i$ and blade phase delay $\exp(-iM\varphi_i)$. $M\Omega$ is calculated by $\omega t = M\Omega$.

The $\beta$ storage unit 57-x is a database that stores control sound source volume velocity phase difference $\beta_k = \exp(-iM\varphi'_k)$. $\varphi'_k = 2\pi j/Lc$ ($k=0, \ldots, (Lc-1)$).

The $\beta$ determination unit 59-x determines control sound source volume velocity phase difference $\beta_{kx}$ corresponding to target order x. Specifically, the $\beta$ determination unit 59-x selects control sound source volume velocity phase difference $\beta_{kx}$ corresponding to target order x, from a plurality of control sound source volume velocity phase differences $\beta_k$ stored in the $\beta$ storage unit 57-x.

The q computation unit 61-x computes control sound source volume velocity $q_{sx}$ using the optimum volume velocity equation (equation (8)) based on main sound source volume velocity $\alpha_{ix}$ estimated by the $\alpha$ estimation unit 55-x, rotation speed $\Omega_{es}$ estimated by the rotation speed estimation unit 41, and control sound source volume velocity phase difference $\beta_{kx}$ by the $\beta$ determination unit 59-x.

In the case of the rotor 11 having fixed rotation speed, the rotation speed estimation unit 41 is not necessary. This case uses previously-measured rotation speed. In this case, transmission characteristic $C_{ij}(t)$ takes a fixed value. Thus, previously-measured transmission characteristic $C_{ij}(t)$ may be used.

Described next are the configuration and processing of each q computation unit 45-x concerning order x according to the configuration example 2 (the case where amplitude ratio $\beta_{amp-k}$ is included in the control sound source volume velocity). In the description below, structural elements having substantially the same functions as those in the configuration example 1 will be denoted by the same reference symbols, and a repetitive description of such elements will be given only where necessary.

Figure 9:
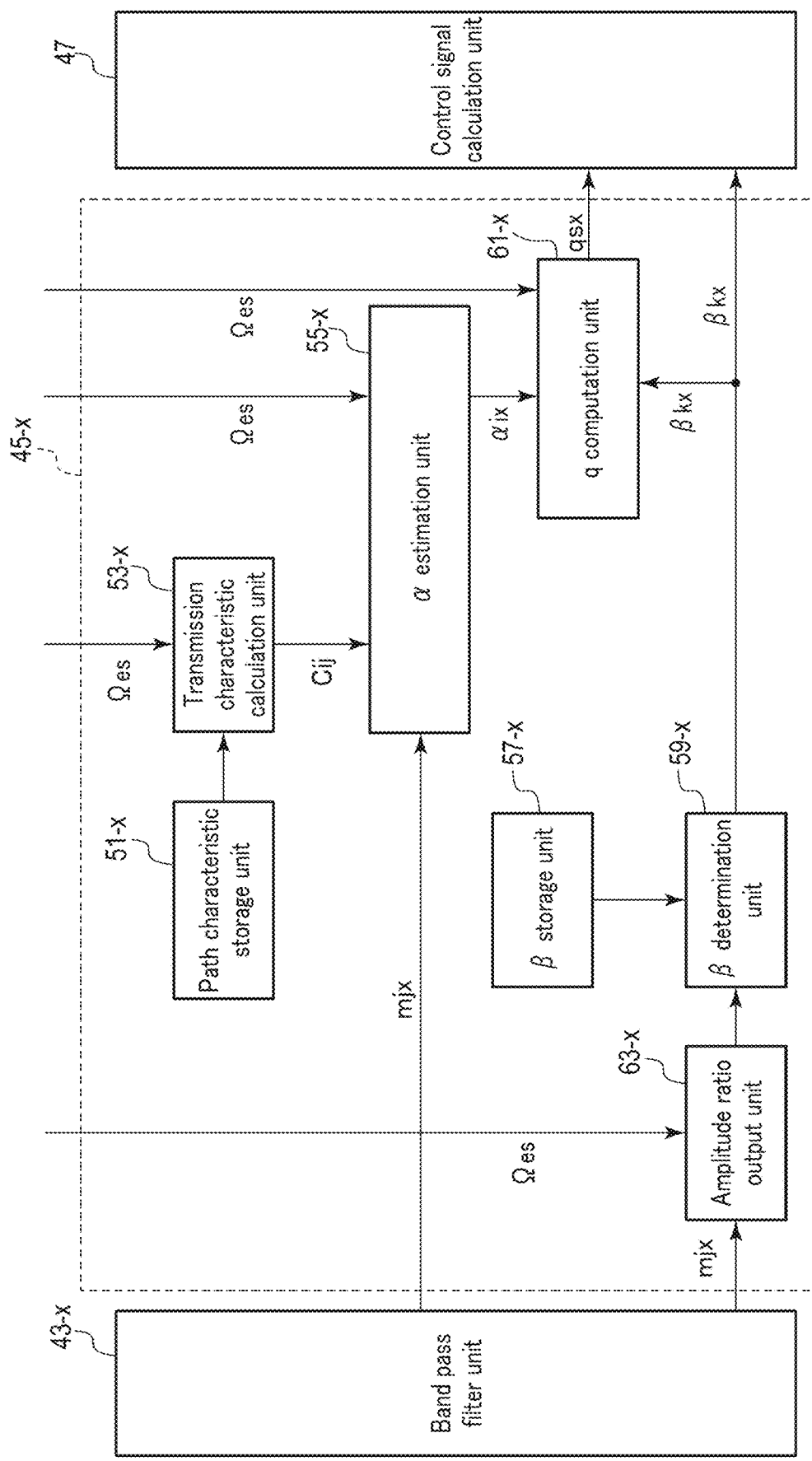
FIG. 9 is a diagram showing the configuration of a q computation unit regarding order x according to the configuration example 2.

FIG. 9 is a diagram showing the configuration of each q computation unit 45-x regarding order x according to the configuration example 2. As shown in FIG. 9, each q computation unit 45-x includes an amplitude ratio output unit 63-x in addition to the path characteristic storage unit 51-x, the transmission characteristic calculation unit 53-x, the $\alpha$ estimation unit 55-x, the $\beta$ storage unit 57-x, the $\beta$ determination unit 59-x, and the q computation unit 61-x.

The amplitude ratio output unit 63-x outputs an amplitude ratio based on post-processing microphone signal $m_{jx}$ from each microphone. Specifically, the amplitude ratio output unit 63-x calculates sound pressure $P_j$ by performing frequency analysis such as FFT to post-processing microphone signal $m_{jx}$, thereby calculating half-amplitude $MA_j$ of post-processing microphone signal $m_{jx}$ based on sound pressure $P_j$. Half-amplitude $MA_j$ is defined by equation (24) below.

$$MA_j = 10^{P_j/20} \tag{24}$$

Figure 10:
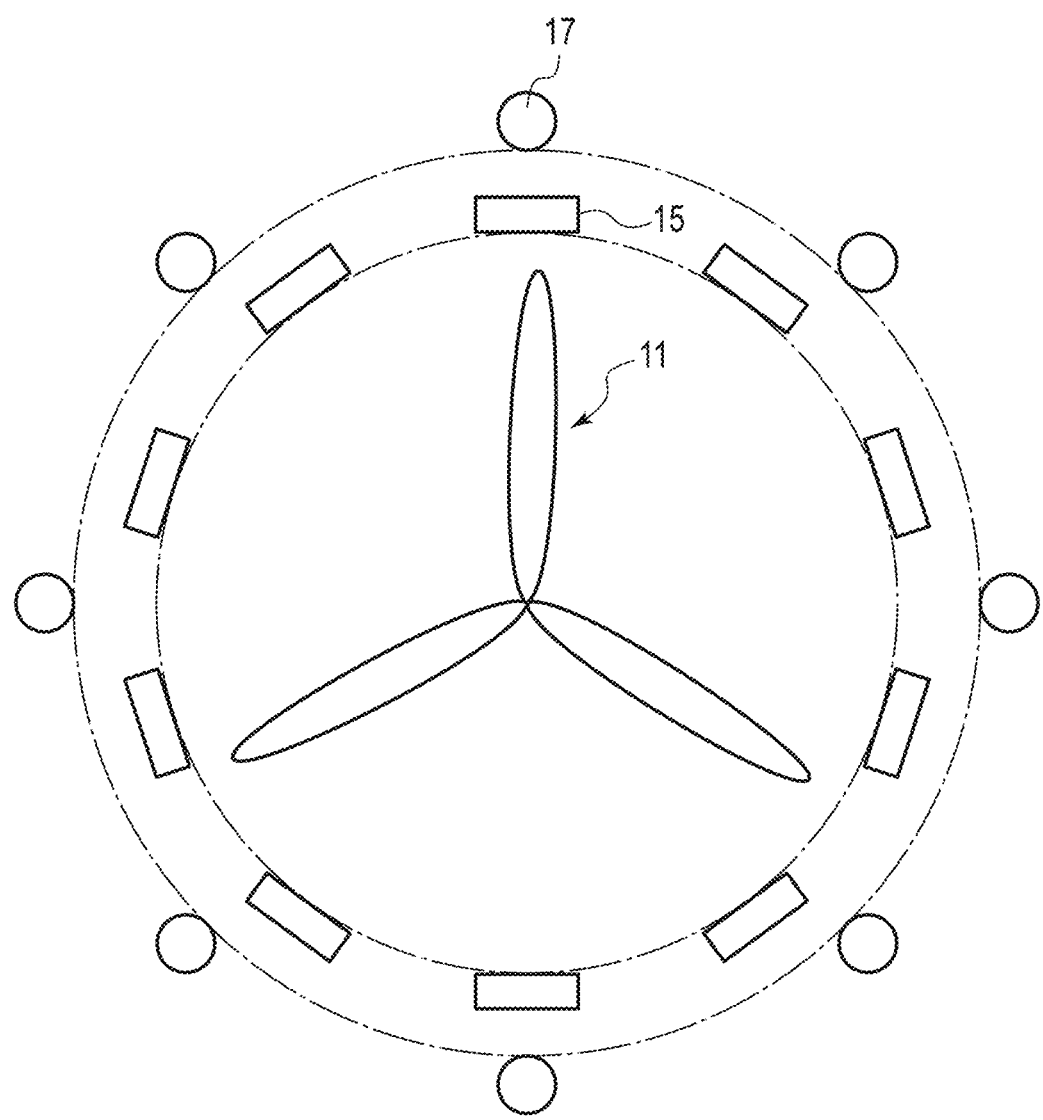
FIG. 10 is a view showing a position relationship between the speakers and the microphones according to the present embodiment.

As shown in FIG. 10, in the case where speakers and microphones are equal in number and have substantially the same installation angles, amplitude ratio $\beta_{amp-kx}$ is calculated based on half-amplitude $MA_j$ of a reference angle and half-amplitude $MA_k$ of a calculation target k. Amplitude ratio $\beta_{amp-kx}$ is defined by equation (25) below.

$$\beta_{amp-kx} = MA_k/MA_1 \tag{25}$$

Figure 11:
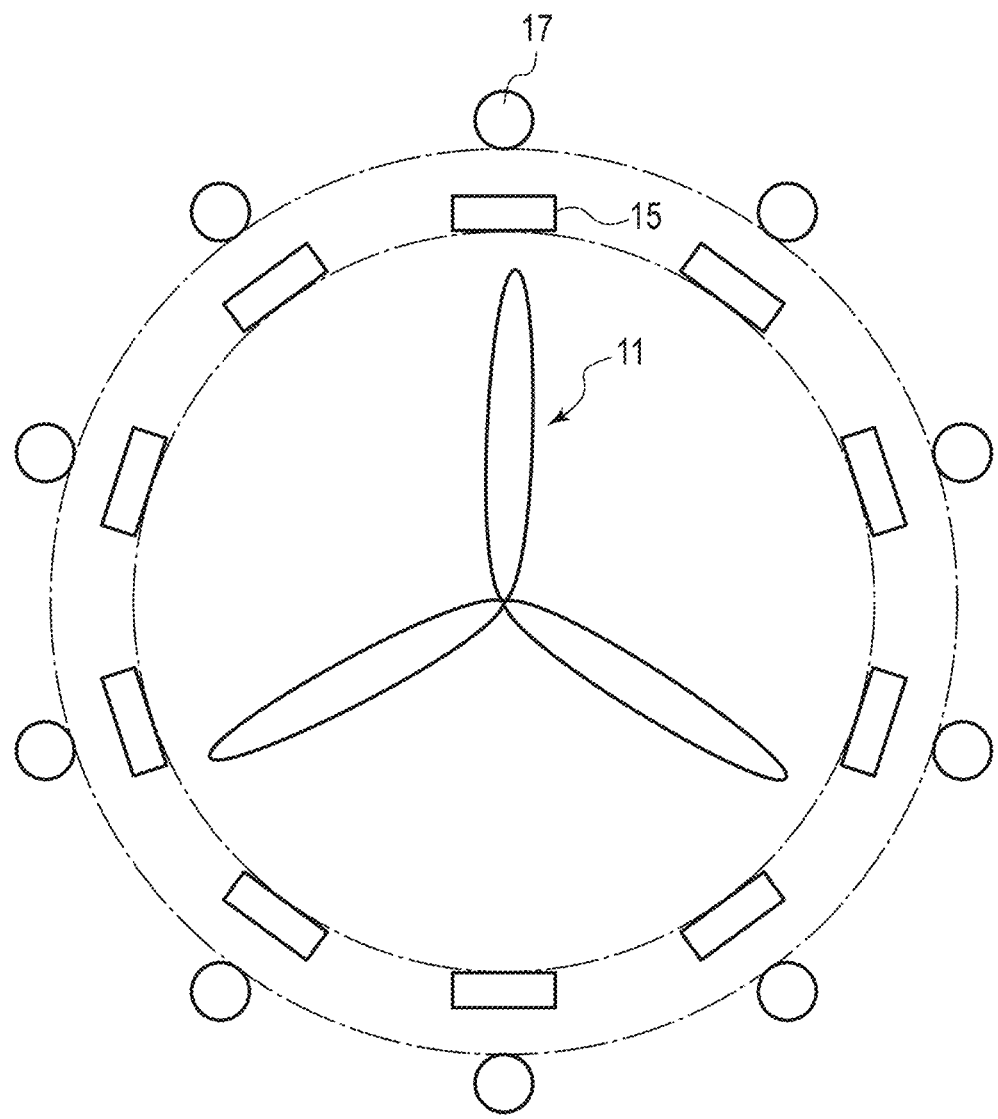
FIG. 11 is a view showing another position relationship between the speakers and the microphones according to the present embodiment.

As shown in FIG. 11, in the case where more speakers exist than microphones or where speakers and microphones have different installation angles, half-amplitude $MA_k$ in a position of each speaker k is calculated by applying spline interpolation to measured half-amplitude $MA_j$ at an angle around rotation center A1, and amplitude ratio $\beta_{amp-kx}$ is then calculated based on half-amplitude $MA_{j'}$ of a reference angle and half-amplitude $MA_{k'}$ of calculation target k. Amplitude ratio $\beta_{amp-kx}$ is defined by equation (26) below.

$$\beta_{amp-kx} = MA'_k/MA'_1 \tag{26}$$

The $\beta$ determination unit 59-x determines control sound source volume velocity phase difference $\beta_{kx}$ corresponding to target order x based on amplitude ratio $\beta_{amp-kx}$ output from the amplitude ratio output unit 63-x and output $\exp(-iM\varphi'_k)$ from the $\beta$ storage unit 57-x. Control sound source volume velocity phase difference $\beta_{kx}$ is defined by equation (27) below.

$$\beta_{kx} = e^{-iM\varphi'_k}\beta_{amp-kx} (k=0, \ldots, (Lc-1)) \tag{27}$$

In the configuration example 1, in the case where the main sound source volume velocity includes amplitude ratio $\alpha_{amp-i}$, blade-tip noise is not caused axially symmetrically, so that the control effect is sometimes deteriorated. However, in the configuration example 2, amplitude ratio $\beta_{amp-k}$ is included in the control sound source volume velocity, too. As described above, the inclusion of amplitude ratio $\beta_{amp-k}$ enables volume velocity of a speaker to reflect a sound pressure distribution of blade-tip noise in a position of this speaker. This improves the control effect. In the case where time variation is small in a circumferential sound pressure distribution of blade-tip noise, amplitude ratio $\beta_{amp-kx}$ may be determined based on a sound pressure distribution that is previously measured in a position of a speaker. Furthermore, in the case of the rotor 11 having fixed rotation speed, the rotation speed estimation unit 41 is not necessary. This case uses previously-measured rotation speed. In this case, transmission characteristic $C_{ij}(t)$ takes a fixed value. Thus, previously-measured transmission characteristic $C_{ij}(t)$ may be used.

Next, the validity of control signal generation processing according to the present embodiment is verified by simulations from the verification example 1 to the verification example 3. The simulation conditions are as follows.

Estimated number Lp of main sound sources: 36, Radius a of a main sound source: 0.23 m
Estimated number of microphones: Lm, Radius c: 0.35 m
Main sound source volume velocity amplitude ratio: $\alpha_{amp-i} = amp \times \sin(hza \times (\varphi_i + \pi/10)) + 1$
Estimated number Lpes of main sound sources: 14
Relative phase angle $\alpha_{initialphase}$ of entire main sound sources
Step size: $\mu=0.005$, $\mu 2=0.01$ Verification Example 1

Figure 12A:
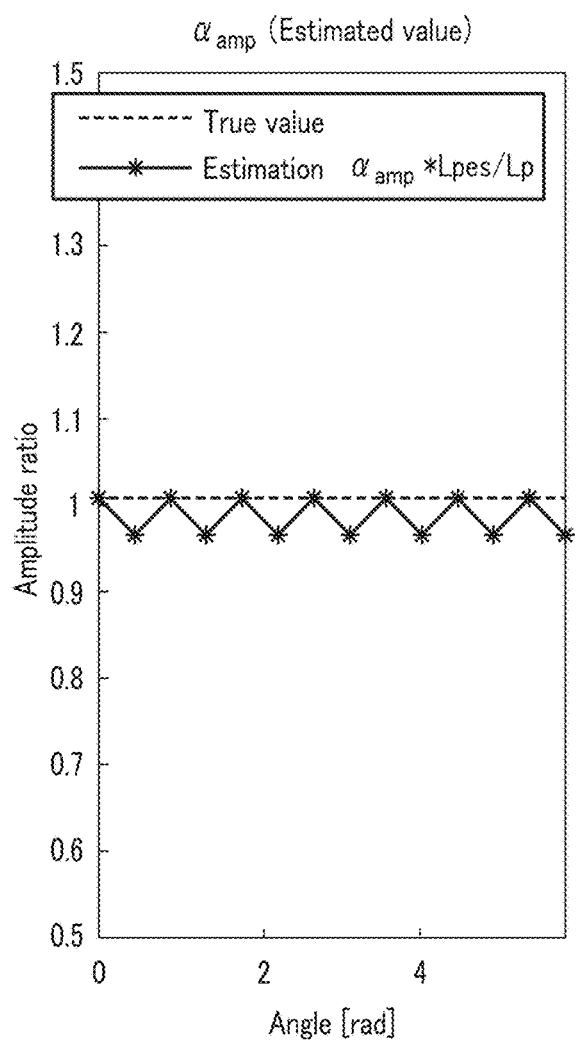
FIG. 12A is a graph showing the estimation result of $\alpha_{amp}$ included in $W_i$ under the first simulation conditions according to the verification example 1.
Figure 12B:
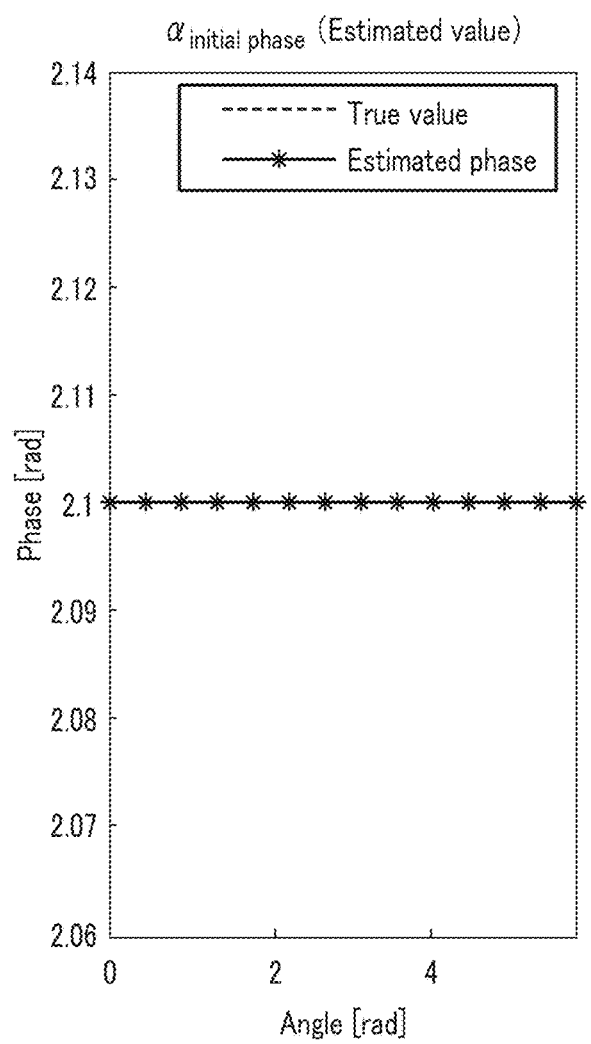
FIG. 12B is a graph showing the estimation result of $\alpha_{initialphase}$ included in $W_i$ under the first simulation conditions according to the verification example 1.

FIGS. 12, 13, and 14 show estimation results of $w_i = -e^{i\alpha_{initialphase}}\alpha_{amp-i}$ ($i=1, \ldots, L_{pes}$), made by the $\alpha$ estimation unit under the above simulation conditions. FIGS. 12A and 12B are graphs showing estimation results of $w_i$ under the first simulation conditions. The first simulation conditions are that Lm=7, amp=0, hza=0, $\alpha_{initialphase}$=2.1 [rad], with no presence of a main sound source volume velocity amplitude ratio. FIGS. 13A and 13B are graphs showing estimation results of $w_i$ under the second simulation conditions. The second simulation conditions are that Lm=7, amp=0.1, hza=3, and $\alpha_{initialphase}$=2.1 [rad]. FIGS. 14A and 14B are graphs showing estimation results of $w_i$ under the third simulation conditions. The third simulation conditions are that Lm=10, amp=0.3, hza=4, and $\alpha_{initialphase}$=−1.8 [rad]. In FIGS. 12A, 13A, and 14A, a vertical axis is defined by $\alpha_{amp}$ of main sound source volume velocity $\alpha_{amp-i}$ included in $w_i$, while the horizontal axis is defined by angle [rad]. In FIGS. 12B, 13B, and 14B, the vertical axis is defined by $\alpha_{initialphase}$ included in $w_i$, while the horizontal axis is defined by angle [rad]. It is understood that $e^{i\alpha_{initialphase}}\alpha_{amp-i}$ is estimated with sufficient accuracy under any of the first, second, and third simulation conditions. The number of microphones is set to 2×hza+1 or more based on variable frequency hza of a main sound source volume velocity amplitude ratio in order to suppress the influence of space aliasing.

Verification Example 2

Figure 17:
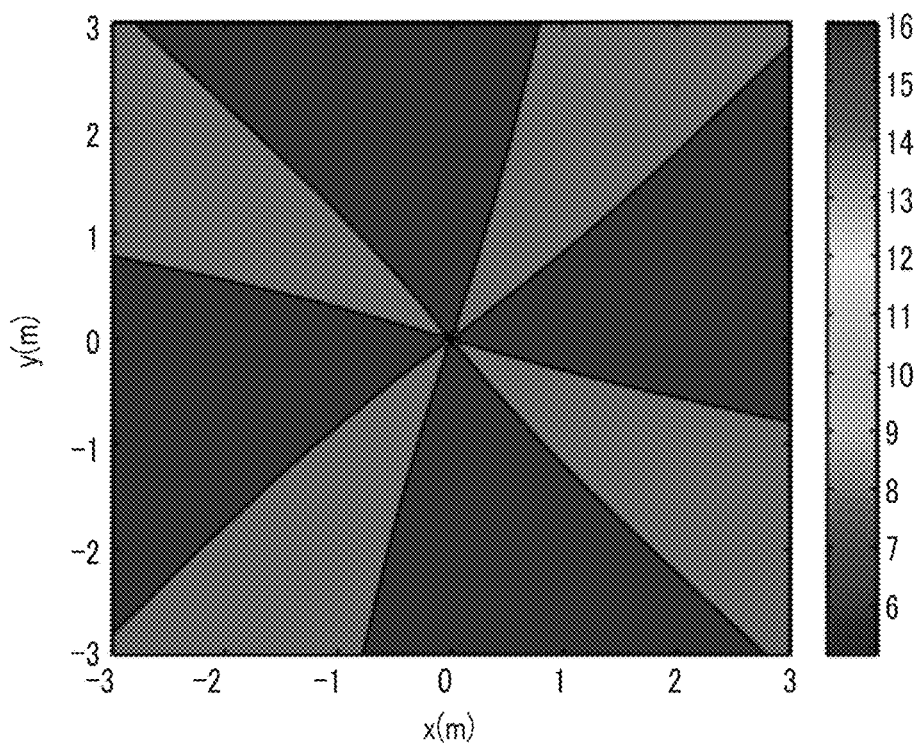
FIG. 17 is a graph showing the acoustic power reduction amount at 3 meters above the blades under the third simulation conditions according to the verification example 2.

FIGS. 15, 16, and 17 show simulation results of noise reduction with the use of the q computation unit of the configuration example 1 using the estimated volume velocity of the verification example 1. FIG. 15 is a graph showing the acoustic power reduction amount in a sound pressure distribution at 3 meters above the blades under the first simulation conditions. FIG. 16 is a graph showing the acoustic power reduction amount at 3 meters above the blades under the second simulation conditions. FIG. 17 is a graph showing the acoustic power reduction amount at 3 meters above the blades under the third simulation conditions. The number of speakers is 7 (Lc=7) under the first and second simulation conditions, and is 10 (Lc=10) under the third simulation conditions. Control sound source arrangement radius b is set to 0.3 m under the first, second, and third simulation conditions. The number of speakers is set to 2M+1 or more under the first, second, and third simulation conditions in order to reduce an aliasing mode as a difference between discrete speaker arrangement and a main sound source. In FIGS. 15, 16, and 17, the vertical axis is defined by distance [m] in the y-axis direction, the horizontal axis is defined by distance [m] in the x-axis direction, and the gray value is defined by reduction amount [dB] of acoustic power. As shown in FIG. 15, the acoustic power reduction amount is 38.5 dB under the first simulation conditions. As shown in FIG. 16, the acoustic power reduction amount is 5.9 dB under the second simulation conditions. As shown in FIG. 17, the acoustic power reduction amount is 16.6 dB under the third simulation conditions. It is clear from FIG. 15 that a main sound source having axially symmetric sound pressure distribution achieves a high control effect. However, as shown in FIG. 16, the control effect is decreased in the case where a main sound source has a sound pressure distribution that is not axially symmetric.

Verification Example 3

Figure 18:
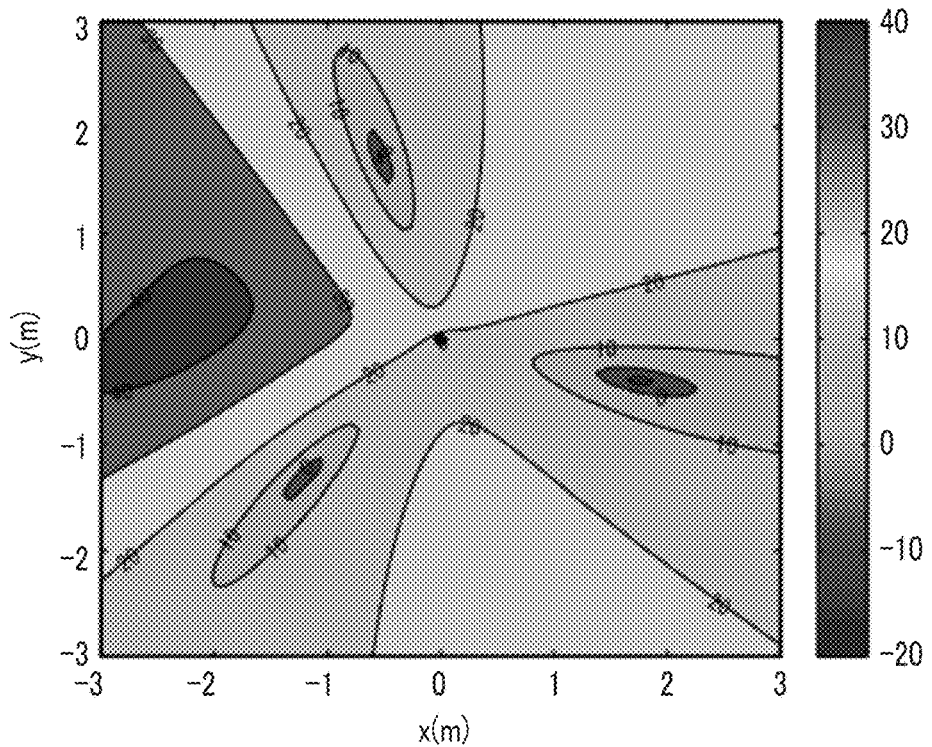
FIG. 18 is a graph showing the acoustic power reduction amount at 3 meters above the blades under the second simulation conditions according to the verification example 3.
Figure 19:
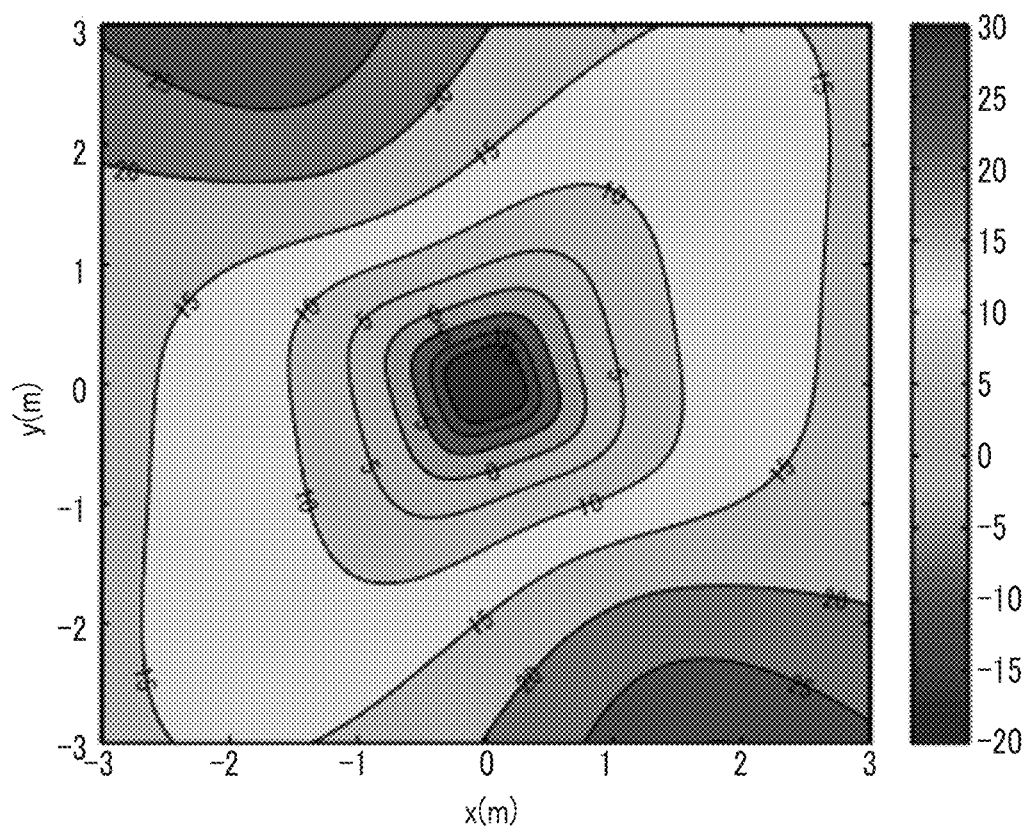
FIG. 19 is a graph showing the acoustic power reduction amount at 3 meters above the blades under the third simulation conditions according to the verification example 3.

In the verification example 2, the control sound source volume velocity amplitude ratio is set to constant. Thus, the control effect is decreased in the case where a sound pressure distribution of a main sound source is considerably deviated from an axially symmetrical state, as in under the second simulation conditions. The verification example 3 uses the q computation unit of the configuration example 2, includes amplitude ratio $\beta_{amp-kx}$ in the control sound source volume velocity, and exhibits a high control effect. FIGS. 18 and 19 show simulation results of noise reduction with the use of the q computation unit of the configuration example 2 using the estimated volume velocity of the verification example 1. FIG. 18 is a graph showing the acoustic power reduction amount at 3 meters above the blades under the second simulation conditions. FIG. 19 is a graph showing the acoustic power reduction amount at 3 meters above the blades under the third simulation conditions. In FIGS. 18 and 19, the vertical axis is defined by distance [m] in the y-axis direction, the horizontal axis is defined by distance [m] in the x-axis direction, and the gray value is defined by reduction amount [dB] of acoustic power. As shown in FIG. 18, the acoustic power reduction amount is 22.2 dB under the second simulation conditions. As shown in FIG. 19, the acoustic power reduction amount is 19.2 dB under the third simulation conditions. It is understood that the second and third simulation conditions are improved in acoustic power reduction amount, that is, control effect, as compared to the verification example 2.

The number of speakers is set to 2M+1 or more in order to reduce an aliasing mode as a difference between discrete speaker arrangement and a main sound source. Furthermore, in order to suppress the influence of space aliasing, the number of speakers is set to 2×hza+1 or more based on variable frequency hza of a main sound source volume velocity amplitude ratio.

Comparative Example

For example, under the second simulation conditions of the verification example 1, in the case where space aliasing conditions are not satisfied, for example, when the number of microphones is 6, the estimation accuracy of the main sound source volume velocity is considerably decreased as shown in FIGS. 20A and 20B. Furthermore, under the third simulation conditions of the verification example 3, in the case where the number of microphones and the number of speakers are both 7, the main sound source volume velocity is estimated as shown in FIGS. 21A and 21B (the estimation is successfully made by chance), and the control effect is low as shown in FIG. 22 (acoustic power reduction amount of 4.6 dB). This is because the number of speakers does not meet the space aliasing conditions.

As described above, in the present embodiment, if variable frequency hza of the main sound source volume velocity amplitude ratio is roughly obtainable, the number of microphones is preferably set to 2×hza+1 or more. The number of speakers is preferably set to 2M+1 or more in order to reduce an aliasing mode as a difference between discrete speaker arrangement and a main sound source. In the configuration example 2, the number of microphones is set to 2×hza+1 or more based on variable frequency hza of a main sound source volume velocity amplitude ratio. In the case where variable frequency hza is unknown, a sufficient number of microphones and speakers are prepared.

The optimum speaker number is calculated by the optimum speaker number calculation unit 235 of the processor circuit 23. The optimum speaker number calculation unit 235 sets the optimum speaker number to 2M+1 or more in the case of the configuration example 1, that is, when the amplitude ratio $\beta_{amp-k}$ is not included in the control sound source volume velocity. This is to reduce an aliasing mode as a difference between discrete speaker arrangement and a main sound source. Herein, M represents a product of B as the number of blades and the maximum value X of control target order x. In this case, the optimum speaker number calculation unit 235 adds 2 to twice a product of B as the number of blades and the maximum value X of control target order x, thereby calculating value 2BX+2 as the lower limit of the optimum speaker number. In the case of the configuration example 2, that is, when the main sound source volume velocity amplitude ratio is taken into consideration, the optimum speaker number is set to 2×hza+1 or more. This is to suppress the influence of space aliasing. In this case, the optimum speaker number calculation unit 235 adds 1 to twice variable frequency hza, thereby calculating value 2×hza+1 as the lower limit of the optimum microphone number. Therefore, the optimum microphone number is set to a value greater than twice variable frequency hza, in other words, value 2×hza+1 or greater.

The optimum microphone number is calculated by the optimum microphone number calculation unit 237 of the processor circuit 23. The optimum microphone number calculation unit 237 calculates the optimum microphone number based on a variable frequency calculated by the variable frequency calculation unit 233. Specifically, as described above, the optimum microphone number calculation unit 237 adds 1 to twice variable frequency hza, thereby calculating value 2×hza+1 as the lower limit of the optimum microphone number. Therefore, the optimum microphone number is set to a value greater than twice variable frequency hza, in other words, value 2×hza+1 or greater.

FIG. 23 is a diagram showing an example of a display screen I1 for the optimum microphone number and the optimum speaker number. As shown in FIG. 23, the display screen I1 includes a display region R1 for the optimum speaker number and a display region R2 for the optimum microphone number. The display region R1 displays the optimum speaker number calculated by the optimum speaker number calculation unit 235. The display region R1 displays the lower limit of the optimum speaker number. For example, in the case where the lower limit of the optimum speaker number is 15, the display region R1 displays "15 or greater". The display region R1 may display a given value greater than or equal to the lower limit of the optimum speaker number. The display region R2 displays the optimum microphone number calculated by the optimum microphone number calculation unit 237. The display region R2 displays the lower limit of the optimum microphone number. For example, in the case where the lower limit of the optimum microphone number is 7, the display region R2 displays "7 or greater". The display region R2 may display a given value greater than or equal to the lower limit of the optimum microphone number.

Displaying the optimum speaker number and the optimum microphone number enables a user to know the optimum speaker number and the optimum microphone number for active noise control so that the optimum speaker number of speakers and the optimum microphone number of microphones can be mounted on the frame 113. This improves active noise control over blade-tip noise of the rotor 11.

According to FIG. 23, both the optimum speaker number and the optimum microphone number are displayed. However, either one of them may be displayed.

Next, processing by the noise reduction device 1 according to the present embodiment will be described in the two examples, the embodiment example 1, and the embodiment example 2.

Embodiment Example 1

The embodiment example 1 corresponds to the case where the rotor 11 rotates at constant rotation speed. In the case of the rotation speed being constant, the control signal generation unit 231 does not need to include the rotation speed estimation unit 41.

In the case where rotation speed of the rotor 11 is constant and where a load change is so small that the main sound source volume velocity is hardly varied during rotation of the rotor 11, processing performed by the control signal generation unit 231 can take the following three modes.

Mode 1: In an initial interval during rotation of the rotor 11, the control signal generation unit 231 executes estimation of the main sound source volume velocity by the α estimation unit 55 and determination of the control sound source volume velocity by the q computation unit 61. The initial interval represents a time during which estimation of the main sound source volume velocity can be sufficiently executed. Next, the control signal generation unit 231 regards the control sound source volume velocity as constant and repeatedly generates a constant control signal based on the control sound source volume velocity determined in the initial interval by the control signal calculation unit 47. The control signal is repeatedly supplied to the speakers 15 through the control signal supply circuit 19, so that the control sound is emitted from the speakers 15. In this manner, active noise control is executed. Executing estimation of the main sound source volume velocity and determination of the control sound source volume velocity by the q computation unit 61 is limited to an initial interval. A computation load on the processor circuit 23 can be reduced by this limitation.

Mode 2: The control signal generation unit 231 executes estimation of the main sound source volume velocity by the α estimation unit 55 and determination of control sound source volume velocity by the q computation unit 61, at each predetermined measurement time. Next, the control signal calculation unit 47 of the control signal generation unit 231 repeatedly generates a control signal based on the control sound source volume velocity at every measurement time. At a non-measurement time between measurement times, a control signal is generated using the control sound source volume velocity measured at the measurement time just before this non-measurement time. Estimation of the main sound source volume velocity and determination of the control sound source volume velocity by the q computation unit 61 are executed only at predetermined measurement times. In this manner, a computation load on the processor circuit 23 can be reduced. This mode has a higher real-time property than the mode 1, thereby being able to respond to change in rotation speed or environment after an initial period.

Mode 3: Estimation of the main sound source volume velocity and determination of the control sound source volume velocity are not executed in real time, but are executed offline by an external PC, etc. Control sound source volume velocity obtained by an external PC etc., is supplied to the control signal calculation unit 47 of the control signal generation unit 231, and a control signal is generated based on this control sound source volume velocity. For example, when the mode 3 is applied to the mode 2, the control sound source volume velocity is supplied at every measurement time by an external PC etc., and a control signal is generated based on this control sound source volume velocity. The mode 3 can reduce a calculation load on the processor circuit 23. Estimation of the main sound source volume velocity and determination of the control sound source volume velocity are executed offline by using mode 3, and mode 3 is applied to mode 1 after a certain time. A computation load can be reduced in this manner.

Embodiment Example 2

The embodiment example 2 corresponds to the case where the rotor 11 rotates at constant rotation speed with high rotation reproducibility. Rotation reproducibility indicates reproducibility of movement of the rotor 11 from activation of a driving device 16 until the rotor 11 reaches steady rotation. With good rotation reproducibility, the main sound source volume velocity is also considered to have reproducibility. In such a case, there is no need to execute estimation of the main sound source volume velocity during active noise control, thereby making it possible to previously determine the main sound source volume velocity and control sound source volume velocity based on this main sound source volume velocity.

Hereinafter, a flow of processing by the noise reduction device 1 according to the embodiment example 2 will be described.

Figure 24:
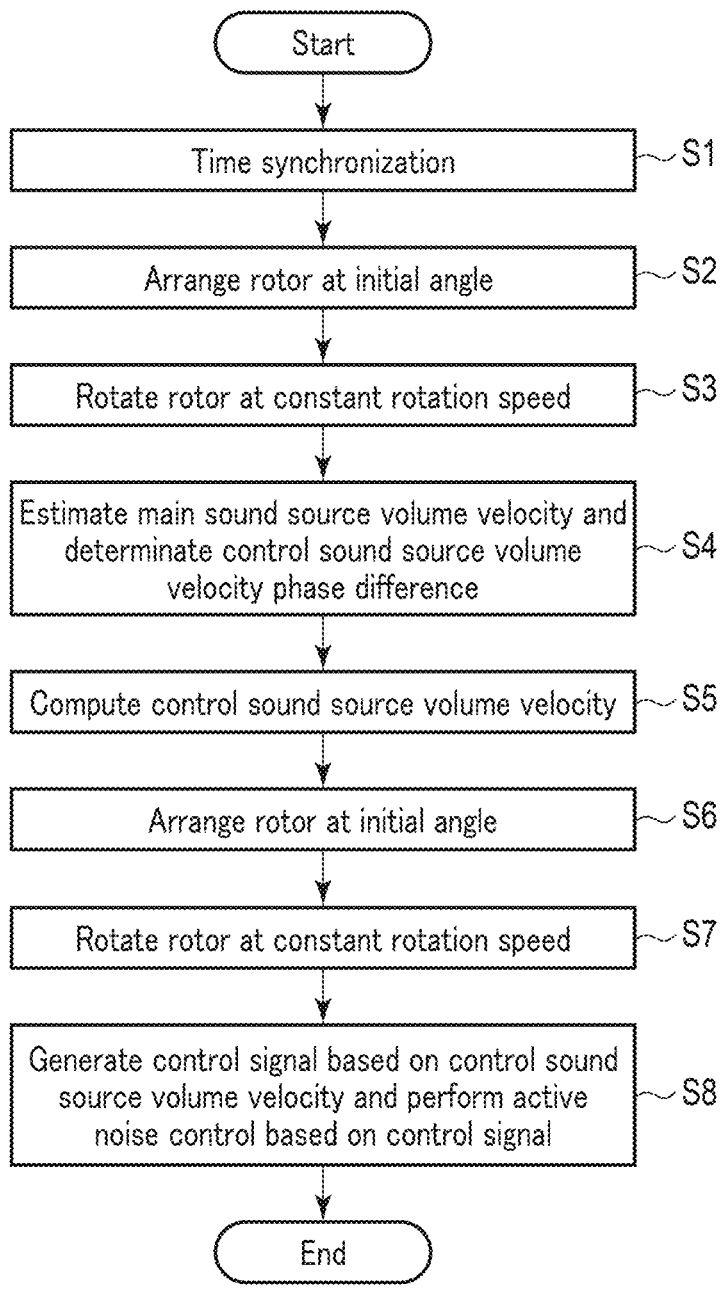
FIG. 24 is a flowchart showing a typical flow of processing made by a noise reduction device according to the embodiment example 2.

FIG. 24 is a flowchart showing a typical flow of processing performed by the noise reduction device 1 according to the embodiment example 2. At the start time shown in FIG. 24, the driving device 16 has not been activated and the rotor 11 has not been rotated.

As shown in FIG. 24, the driving device 16, the driving control unit 239, and the control signal generation unit 231 are time-synchronized (step S1). This is to synchronize times (clock signals) of a sequence of controlling the rotor 11 and a sequence of generating a control signal. Hardware resources involved in the sequence of controlling the rotor 11 include the driving device 13 configured to perform voltage control, current control, etc., and the driving control unit 239 configured to control this driving device 13. Hardware resources involved in a generation sequence of the control signal include the control signal generation unit 231 and the control signal supply circuit 19. The control signal generation unit 231 includes a CPU, FPGA (Field Programmable Gate Array), and DSP (Digital Signal Processor).

When step S1 is performed, the rotor 11 is arranged at an initial angle. To arrange the rotor 11 at an initial angle (step S2), the rotor 11 may be electrically rotated by the driving device 13, or may be manually rotated by a user. In order to constantly set an initial position of the rotor 11 at a fixed angle, a blade angle measurement instrument (such as an encoder light sensor) needs to be mounted.

When step S2 is performed, the rotor 11 is rotated by the driving device 13 at constant rotation speed (step S3). For example, upon pressing of a rotation button provided in the noise reduction device 1, the driving control unit 239 supplies to the driving device 12 a driving pulse signal stream corresponding to a predetermined rotation speed, so that the driving device 12 rotates the rotor 11 at this rotation speed. Accordingly, blade-tip noise is caused from the rotor 11.

When step S3 is performed, the α estimation unit 55-$x$ of the control signal generation unit 231 calculates main control source volume velocity $\alpha_{ix}$ of control target order x using equations (16) to (21) above (step S4). The β determination unit 59-$x$ determines control sound source volume velocity phase difference $\beta_{kx}$ of control target order x (step S4). In the case of configuration example 1 shown in FIG. 8, the β determination unit 59-$x$ reads from the β storage unit 57-$x$, control sound source volume velocity phase difference $\beta_{kx}$ regarding control target order x. In the case of configuration example 2 shown in FIG. 9, the β determination unit 59-$x$ determines control sound source volume velocity phase difference $\beta_{kx}$ corresponding to control target order x based on amplitude ratio $\beta_{amp-kx}$ output from the amplitude ratio output unit 63-$x$ and output $\exp(-iM\varphi'_k)$ from the storage unit 57-$x$. Main sound source volume velocity $\alpha_{ix}$ and control sound source volume velocity $\beta_{kx}$ are calculated for all control target orders.

The embodiment example 2 does not require execution of real-time estimation of main sound source volume velocity $\alpha_{ix}$ and real-time determination of control sound source volume velocity $\beta_{kx}$. Therefore, in the embodiment example 2, only recording of a microphone signal may be necessary. In such a case, estimation of main sound source volume velocity $\alpha_{ix}$ and determination of control sound source volume velocity $\beta_{kx}$ are executed offline by an external server or an external PC such as a cloud computer, using a recorded microphone signal. In the case of configuration example 2, amplitude ratio $\beta_{amp-kx}$ is also output using a recorded microphone signal.

When step S4 is performed, the q computation unit 61-$x$ of the control signal generation unit 231 computes control sound source volume velocity $q_{sx}$ using optimum volume velocity equation (equation (8)) based on main sound source volume velocity $\alpha_{ix}$ estimated by the α estimation unit 55-$x$, rotation speed $\Omega_{es}$ estimated by the rotation speed estimation unit 41, and control sound source volume velocity phase difference $\beta_{kx}$ by the β determination unit 59-$x$ (step S5). Control sound source volume velocity $q_{sx}$ is calculated for all control target orders.

When step S5 is performed, the rotor 11 is arranged at the initial angle again as in step S2 (step S6), and the rotor 11 is rotated by the driving device 13 at the constant rotation speed as in step S3 (step S7).

When step S7 is performed, the control signal calculation unit 47 repeatedly generates control signal $u_{jx}$ for each speaker based on control sound source volume velocity $q_{sx}$ calculated at step S5 and control sound source volume velocity phase difference $\beta_{kx}$ determined at step S4, using equations (22) and (23) (step S8). Control signal $u_{jx}$ is repeatedly supplied to each speaker 15 through the control signal supply circuit 19, so that active noise control is continuously performed (step S8). In the embodiment example 2, the rotor 11 rotates at constant rotation speed with high rotation reproducibility. Thus, the embodiment example 2 does not need to obtain main sound source volume velocity $\alpha_{ix}$ and control sound source volume velocity $q_{sx}$ in real time. For this reason, active noise control can be performed with high accuracy using main sound source volume velocity $\alpha_{ix}$ and control sound source volume velocity $q_{sx}$ that are obtained in advance.

Step S8 does not require use of the microphones 17. Thus, at the time of active noise control, the microphones 17 may be removed.

The flow of processing by the noise reduction device 1 according to the embodiment example 2 has been explained above.

As explained above, the noise reduction device 1 according to the present embodiment includes the speakers 15, the microphones 17, and the control signal generation unit 231.

The speakers 15 are arranged around the rotor 11 and emit control sound. The microphones 17 are arranged around the rotor 11, and collect control sound and noise emitted from the rotor 11 for conversion into microphone signals. The control signal generation unit 231 generates control signals to be supplied to the speakers 15 in order to cause control sound for reducing acoustic power in positions of the microphones 17, based on microphone signals, rotation speed, and a noise phase.

With the above configuration, a control signal is generated in consideration of a microphone signal, rotation speed, and a noise phase, thereby making it possible to perform active noise control over blade-tip noise with high accuracy. At this time, the control signal generation unit 50 estimates the main sound source volume velocity by incorporating microphone signals from the plurality of microphones 17 into a transmission characteristic model, and directly derives the control sound source volume velocity for minimizing acoustic power, based on the main sound source volume velocity. Therefore, the control performance is improved as compared to indirect active noise control performed by reducing error microphone sound pressure. In addition, the noise reduction device 1 according to the present embodiment performs active noise control by emitting control sound from the speakers 15. Therefore, the configuration is simpler in comparison to a method for adjusting acoustic impedance.

Next, an example in which the noise reduction device according to the present embodiment is applied to a flight vehicle is described. Assume that a flight vehicle is a helicopter. In the description below, structural elements having substantially the same functions as those in the present embodiment will be denoted by the same reference symbols, and a repetitive description of such elements will be given only where necessary.

Figure 25:
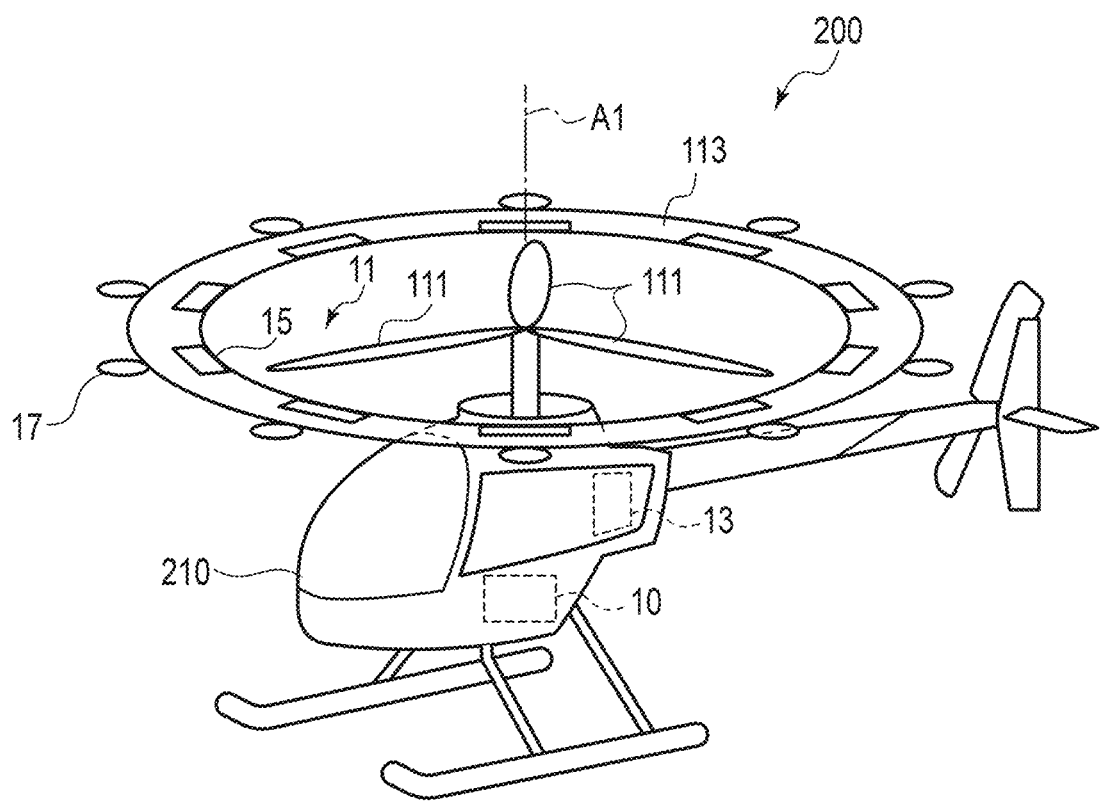
FIG. 25 is a view showing an appearance of a flight vehicle (helicopter) according to the present embodiment.

FIG. 25 is a view showing an appearance of a flight vehicle (helicopter) 200 according to the present embodiment. As shown in FIG. 25, the helicopter 200 includes a fuselage 210. The rotor 11 is mounted on the fuselage 210. The rotor 11 includes the plurality of blades 111 that rotate about the rotation axis A1. The fuselage 210 flies by thrust force and lift force caused by rotation of the rotor 11.

When the rotor 11 installed on the helicopter 200 is rotated, blade-tip noise is caused. To perform active noise control over blade-tip noise, the noise reduction device is mounted on the helicopter 200. That is, the speakers 15 and the microphones 17 are arranged around the rotor 11. Specifically, the frame 113 formed in an annular shape is provided around the rotor 11, and the plurality of speakers 15 and microphones 17 are arranged on the frame 113, concentrically with the rotation axis A1 as a center. The speakers 15 emit control sound. The microphones 17 collect control sound emitted from the speakers 15 and blade-tip noise emitted from the rotor 11, thereby converting them into microphone signals.

As shown in FIG. 25, the fuselage 210 incorporates a computer 10. The processor circuit 23 included in the computer 10 generates control signals to cause control sound for reducing acoustic power in positions of the microphones 17, based on microphone signals, rotation speed, and a noise phase. The generated control signals are supplied to the speakers 15 through the control signal supply circuit 19 included in the computer 10. The speakers 15 in receipt of the control signals emit control sound corresponding to the control signals. This reduces acoustic power in positions of the microphones 17, thereby realizing active noise control over blade-tip noise caused by the helicopter 200.

Described above is the case where the fuselage 210 incorporates the computer 10. However, the present embodiment is not limited to this configuration. For example, all or part of the structural elements included in the computer 10 may be installed to the outside of the fuselage 210.

Next, an example in which the noise reduction device 1 according to the present embodiment is applied to a power generation device is described. Assume that a power generation device is a wind power generation device. In the description below, structural elements having substantially the same functions as those in the present embodiment will be denoted by the same reference symbols, and a repetitive description of such elements will be given only where necessary.

Figure 26:
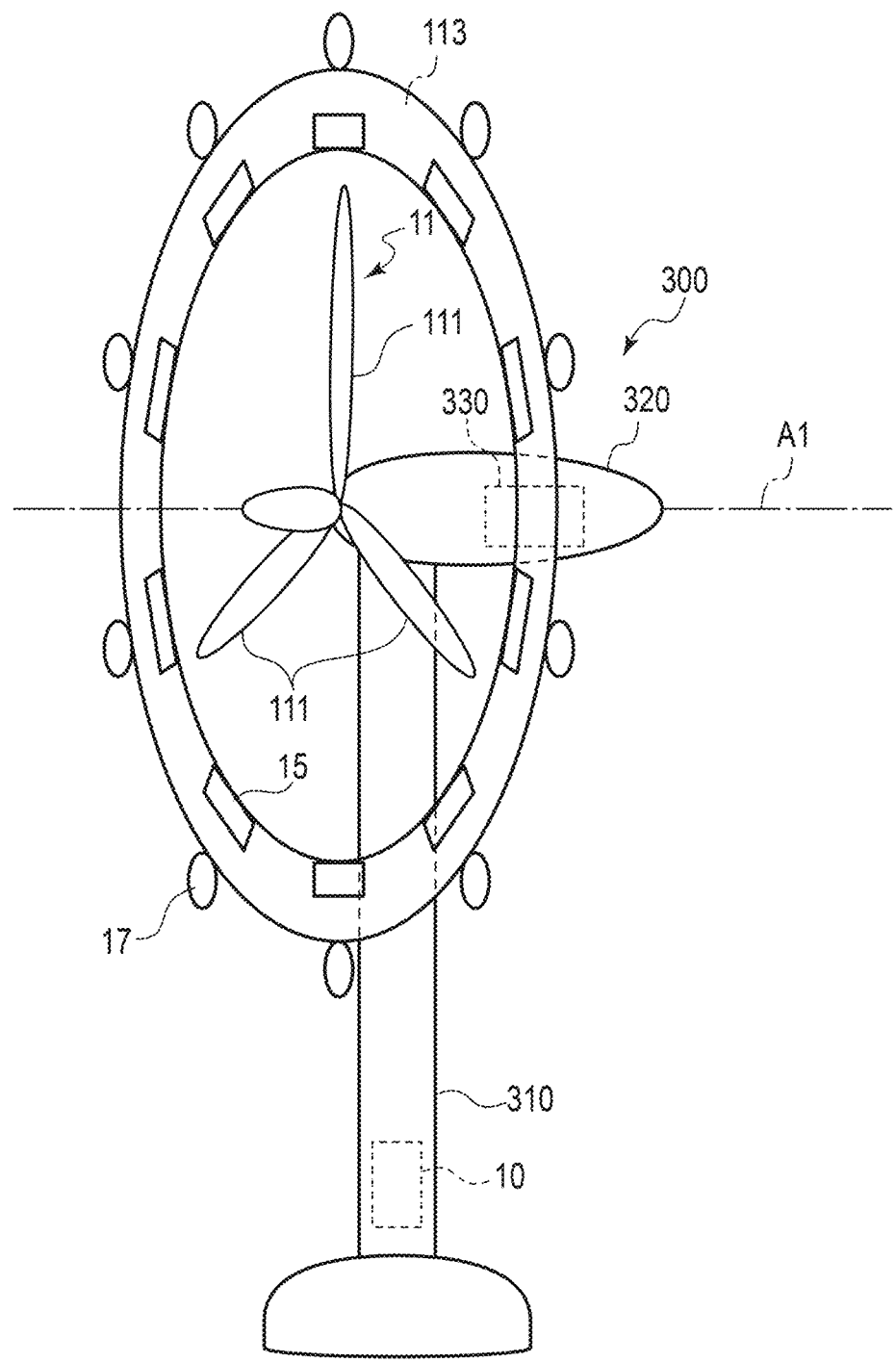
FIG. 26 is a view showing an appearance of a power generation device (wind power generation device) according to the present embodiment.

FIG. 26 is a view showing an appearance of a power generation device (wind power generation device) 300 according to the present embodiment. As shown in FIG. 26, the wind power generation device 300 includes a support pillar 310 installed on the surface of the ground. A nacelle 320 is mounted on the support pillar 310. The nacelle 320 is provided with the rotor 11 including the plurality of blades 111 that rotate about the rotation axis A1. Upon receipt of wind power as external force, the rotor 11 rotates about the rotation axis A1. The nacelle 320 incorporates a power generator 330. The power generator 330 generates power in conjunction with the rotation of the rotor 11. The generated power is stored in a storage battery (not shown), or is transmitted to another facility via a transmission system.

With the rotation of the rotor 11 installed on the wind power generation device 300, blade-tip noise is caused. For active noise control of blade-tip noise, the noise reduction device is mounted on the wind power generation device 300. That is, the speakers 15 and the microphones 17 are arranged around the rotor 11. Specifically, the frame 113 formed in an annular shape is provided around the rotor 11, and the plurality of speakers 15 and microphones 17 are concentrically arranged on the frame 113 with the rotation axis A1 as a center. The speakers 15 emit control sound. The microphones 17 collect control sound emitted from the speakers 15 and blade-tip noise emitted from the rotor 11, thereby converting them into microphone signals.

As shown in FIG. 26, the support pillar 310 incorporates a computer 10. The processor circuit 23 included in the computer 10 generates control signals to cause control sound for reducing acoustic power in positions of the microphones 17, based on microphone signals, rotation speed, and a noise phase. The generated control signals are supplied to the speakers 15 through the control signal supply circuit 19 included in the computer 10. The speakers 15 in receipt of the control signals emit control sound corresponding to the control signals. This reduces acoustic power in positions of the microphones 17, thereby realizing active noise control over blade-tip noise caused in the wind power generation device 300.

Described above is the case where the support pillar 310 incorporates the computer 10. However, the present embodiment is not limited to this case. For example, all or part of the structural elements included in the computer 10 may be installed to the nacelle 320 or installed to the outside of the support pillar 310 and the nacelle 320.

According to at least one embodiment described above, it is possible to improve the control effect of active noise control over blade-tip noise of the rotor.

While certain embodiments have been described, they have been presented by way of example only, and are not intended to limit the scope of the invention. Indeed, the novel embodiments described herein may be embodied in a variety of other forms. Furthermore, various omissions, substitutions and changes in the form of the embodiments may be made without departing from the spirit of the invention. The accompanying claims and their equivalents are intended to cover such forms or modifications as would fall within the scope and spirit.

The invention claimed is:

1. A noise reduction device comprising:
   a speaker that is arranged around a rotor and emits control sound based on a control signal;
   a microphone that is arranged around the rotor, and converts the control sound and noise emitted from the rotor into a microphone signal;
   a processing circuit that generates the control signal for reducing acoustic power in a position of the microphone, based on the microphone signal, rotation speed of the rotor, and a phase of noise that reaches the microphone from the rotor,
   wherein:
      the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
      the processing circuit estimates the main sound source volume velocity based on a transmission characteristic of sound from the main sound source to the microphone,
      the microphone includes a plurality of microphones,
      the speaker includes a plurality of speakers,
      the processing circuit estimates the main sound source volume velocity in which an evaluation function is reduced, for each of the microphones, and
      the evaluation function includes:
         a difference between the microphone signal and a computational microphone signal regarding noise that reaches the microphone from the main sound source estimated from the transmission characteristic; and
         a constrained condition for limiting a phase difference of the main sound source volume velocity to only a rotation delay by the rotor.

2. The noise reduction device according to claim 1, wherein the processing circuit determines a transmission characteristic based on predictive calculation based on an installation environment of the rotor and a position relationship between a plurality of blades forming the rotor.

3. The noise reduction device according to claim 1, wherein the processing circuit determines the transmission characteristic based on a path-measurement-dedicated microphone signal regarding path-measurement-dedicated sound, which is emitted from a path-measurement-dedicated speaker installed in a position of the main sound source and is collected by the microphone.

4. The noise reduction device according to claim 1, wherein the processing circuit estimates the rotation speed based on an output signal from a detector that detects rotation of the rotor, an output signal from a detector that detects current to a power source for rotating the rotor, or frequency analysis of the microphone signal.

5. A noise reduction device comprising:
   a speaker that is arranged around a rotor and emits control sound based on a control signal;
   a microphone that is arranged around the rotor, and converts the control sound and noise emitted from the rotor into a microphone signal; and
   a processing circuit that generates the control signal for reducing acoustic power in a position of the microphone, based on the microphone signal, rotation speed of the rotor, and a phase of noise that reaches the microphone from the rotor,
   wherein:
      the speaker includes a plurality of speakers provided on a first circumference around a rotation axis of the rotor as a center, and
      the microphone includes a plurality of microphones provided on a second circumference around the rotation axis of the rotor as a center, the second circumference being longer in radius than the first circumference.

6. The noise reduction device according to claim 5, wherein the microphones are greater in number than twice a variable frequency of a circumferential sound pressure distribution that is produced by the rotor.

7. A noise reduction device comprising:
   a speaker that is arranged around a rotor and emits control sound based on a control signal;
   a microphone that is arranged around the rotor, and converts the control sound and noise emitted from the rotor into a microphone signal;
   a processing circuit that generates the control signal for reducing acoustic power in a position of the microphone, based on the microphone signal, rotation speed of the rotor, and a phase of noise that reaches the microphone from the rotor,
   wherein:
      the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
      the processing circuit calculates control sound source volume velocity based on the rotation speed, the main sound source volume velocity, and the control sound source volume velocity phase difference, and
      the processing circuit calculates the control signal based on the control sound source volume velocity.

8. The noise reduction device according to claim 7, wherein
   the processing circuit includes a storage unit that stores a plurality of orders regarding a harmonic wave and a plurality of phase differences in a manner that the orders are associated with the phase differences, respectively, and
   the processing circuit determines as the control sound source volume velocity phase difference, a phase difference associated with a control target order, out of the plurality of phase differences.

9. The noise reduction device according to claim 8, wherein the speakers are greater in number than twice a product of a number of blades forming the rotor and a maximum value of the control target order.

10. The noise reduction device according to claim 7, wherein
    the processing circuit includes a storage unit that stores a plurality of orders regarding a harmonic wave and a plurality of phase differences in a manner that the orders are associated with the phase differences, respectively, the processing circuit outputs an amplitude ratio in a position of the speaker based on frequency analysis of the microphone signal, and the processing circuit calculates the control sound source volume velocity phase difference based on the amplitude ratio and a phase difference regarding a control target order, out of the plurality of phase differences.

11. The noise reduction device according to claim 10, wherein the speakers are greater in number than twice a variable frequency of a circumferential sound pressure distribution that is produced by the rotor, and are greater in number than twice a product of a number of blades forming the rotor and a maximum value of the control target order.

12. The noise reduction device according to claim 10, wherein in a case where the microphones are equal in number to the speakers and are in proximity to the speakers, the processing circuit outputs, as the amplitude ratio, a ratio of an amplitude of a microphone signal in a position of each of the speakers to an amplitude of a microphone signal in a position of a specific speaker out of the speakers.

13. The noise reduction device according to claim 10, wherein in a case where the microphones are not equal in number to the speakers, the processing circuit calculates an amplitude ratio of a computational microphone signal in a position of each of the speakers by applying spline interpolation to a measured microphone signal from each of the microphones, at an angle around a rotation center of the rotor.

14. The noise reduction device according to claim 1, further comprising a display, wherein the processing circuit calculates an optimum speaker number based on a variable frequency of a circumferential sound pressure distribution that is produced by the rotor, an actual number of the speakers, and a number of blades forming the rotor, the processing circuit calculates an optimum microphone number based on the variable frequency, and the display displays the optimum speaker number and the optimum microphone number.

15. The noise reduction device according to claim 14, wherein the processing circuit estimates the variable frequency by autocorrelation processing based on a microphone signal or Fourier transform based on a microphone signal.

16. The noise reduction device according to claim 1, wherein the processing circuit generates a post-removal microphone signal by removing a signal component of the control sound from the microphone signal based on a transmission characteristic of sound from the speaker to the microphone, and an input signal to the speaker, and the processing circuit uses the post-removal microphone signal as the microphone signal.

17. The noise reduction device according to claim 1, wherein the processing circuit applies in parallel to a plurality of orders regarding a harmonic wave, a plurality of bandpass filters corresponding to the orders, respectively, and outputs a post-filtering microphone signal for each of the plurality of orders, the processing circuit estimates the main sound source volume velocity for each of the plurality of orders using the post-filtering microphone signal as the microphone signal, the processing circuit generates per-order control signals for the plurality of orders, respectively, by using the main sound source volume velocity, and the processing circuit generates the control signal by adding up the per-order control signals for the plurality of orders.

18. The noise reduction device according to claim 1, further comprising a frame formed in an annular shape that covers a blade tip of the rotor, wherein the speaker and the microphone are provided in the frame.

19. A flight vehicle comprising:

a rotor including a plurality of blades that rotate about a rotation axis;

a fuselage that flies by thrust force and lift force caused by rotation of the rotor;

a speaker that is arranged around the rotor and emits control sound based on a control signal;

a microphone that is arranged around the rotor, converts the control sound and noise emitted from the rotor into a microphone signal;

a processing circuit that generates the control signal for reducing acoustic power in a position of the microphone, based on the microphone signal, rotation speed of the rotor, and a phase of noise that reaches the microphone from the rotor, wherein:

the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker, the processing circuit estimates the main sound source volume velocity based on a transmission characteristic of sound from the main sound source to the microphone, the microphone includes a plurality of microphones, the speaker includes a plurality of speakers, the processing circuit estimates the main sound source volume velocity in which an evaluation function is reduced, for each of the microphones, and the evaluation function includes:

a difference between the microphone signal and a computational microphone signal regarding noise that reaches the microphone from the main sound source estimated from the transmission characteristic; and a constrained condition for limiting a phase difference of the main sound source volume velocity to only a rotation delay by the rotor.

20. A power generation device comprising:

a rotor including a plurality of blades that rotate about a rotation axis upon receipt of external force;

a power generation unit that generates power in conjunction with rotation of the rotor;

a speaker that is arranged around the rotor and emits control sound based on a control signal;

a microphone that is arranged around the rotor, converts the control sound and noise emitted from the rotor into a microphone signal;

a processing circuit that generates the control signal for reducing acoustic power in a position of the microphone, based on the microphone signal, rotation speed of the rotor, and a phase of noise that reaches the microphone from the rotor, wherein:
the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
the processing circuit estimates the main sound source volume velocity based on a transmission characteristic of sound from the main sound source to the microphone,
the microphone includes a plurality of microphones,
the speaker includes a plurality of speakers,
the processing circuit estimates the main sound source volume velocity in which an evaluation function is reduced, for each of the microphones, and
the evaluation function includes:
a difference between the microphone signal and a computational microphone signal regarding noise that reaches the microphone from the main sound source estimated from the transmission characteristic; and
a constrained condition for limiting a phase difference of the main sound source volume velocity to only a rotation delay by the rotor.

21. A noise reduction method comprising:
emitting control sound based on a control signal from a speaker arranged around a rotor;
converting the control sound and noise emitted from the rotor into a microphone signal by a microphone that is arranged around the rotor;
generating by a processing circuit, the control signal for reducing acoustic power in a position of the microphone, based on the microphone signal, rotation speed of the rotor, and a phase of noise that reaches the microphone from the rotor,
wherein:
the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
the processing circuit estimates the main sound source volume velocity based on a transmission characteristic of sound from the main sound source to the microphone,
the microphone includes a plurality of microphones,
the speaker includes a plurality of speakers,
the processing circuit estimates the main sound source volume velocity in which an evaluation function is reduced, for each of the microphones, and
the evaluation function includes:
a difference between the microphone signal and a computational microphone signal regarding noise that reaches the microphone from the main sound source estimated from the transmission characteristic; and
a constrained condition for limiting a phase difference of the main sound source volume velocity to only a rotation delay by the rotor.

22. A flight vehicle comprising:
a rotor including a plurality of blades that rotate about a rotation axis;
a fuselage that flies by thrust force and lift force caused by rotation of the rotor;
a speaker that is arranged around the rotor and emits control sound based on a control signal;
a microphone that is arranged around the rotor, converts the control sound and noise emitted from the rotor into a microphone signal;
a processing circuit that generates the control signal for reducing acoustic power in a position of the microphone, based on the microphone signal, rotation speed of the rotor, and a phase of noise that reaches the microphone from the rotor,
wherein:
the speaker includes a plurality of speakers provided on a first circumference around a rotation axis of the rotor as a center, and
the microphone includes a plurality of microphones provided on a second circumference around the rotation axis of the rotor as a center, the second circumference being longer in radius than the first circumference.

23. A flight vehicle comprising:
a rotor including a plurality of blades that rotate about a rotation axis;
a fuselage that flies by thrust force and lift force caused by rotation of the rotor;
a speaker that is arranged around the rotor and emits control sound based on a control signal;
a microphone that is arranged around the rotor, converts the control sound and noise emitted from the rotor into a microphone signal;
a processing circuit that generates the control signal for reducing acoustic power in a position of the microphone, based on the microphone signal, rotation speed of the rotor, and a phase of noise that reaches the microphone from the rotor,
wherein:
the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
the processing circuit calculates control sound source volume velocity based on the rotation speed, the main sound source volume velocity, and the control sound source volume velocity phase difference, and
the processing circuit calculates the control signal based on the control sound source volume velocity.

24. A power generation device comprising:
a rotor including a plurality of blades that rotate about a rotation axis upon receipt of external force;
a power generation unit that generates power in conjunction with rotation of the rotor;
a speaker that is arranged around the rotor and emits control sound based on a control signal;
a microphone that is arranged around the rotor, converts the control sound and noise emitted from the rotor into a microphone signal;

a processing circuit that generates the control signal for reducing acoustic power in a position of the microphone, based on the microphone signal, rotation speed of the rotor, and a phase of noise that reaches the microphone from the rotor, wherein:
- the speaker includes a plurality of speakers provided on a first circumference around a rotation axis of the rotor as a center, and
- the microphone includes a plurality of microphones provided on a second circumference around the rotation axis of the rotor as a center, the second circumference being longer in radius than the first circumference.

25. A power generation device comprising:

a rotor including a plurality of blades that rotate about a rotation axis upon receipt of external force;

a power generation unit that generates power in conjunction with rotation of the rotor;

a speaker that is arranged around the rotor and emits control sound based on a control signal;

a microphone that is arranged around the rotor, converts the control sound and noise emitted from the rotor into a microphone signal;

a processing circuit that generates the control signal for reducing acoustic power in a position of the microphone, based on the microphone signal, rotation speed of the rotor, and a phase of noise that reaches the microphone from the rotor;

wherein:
- the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker,
- the processing circuit calculates control sound source volume velocity based on the rotation speed, the main sound source volume velocity, and the control sound source volume velocity phase difference, and
- the processing circuit calculates the control signal based on the control sound source volume velocity.

26. A noise reduction method comprising:

emitting control sound based on a control signal from a speaker arranged around a rotor;

converting the control sound and noise emitted from the rotor into a microphone signal by a microphone that is arranged around the rotor;

generating by a processing circuit, the control signal for reducing acoustic power in a position of the microphone, based on the microphone signal, rotation speed of the rotor, and a phase of noise that reaches the microphone from the rotor;

wherein:
- the speaker includes a plurality of speakers provided on a first circumference around a rotation axis of the rotor as a center, and
- the microphone includes a plurality of microphones provided on a second circumference around the rotation axis of the rotor as a center, the second circumference being longer in radius than the first circumference.

27. A noise reduction method comprising:

emitting control sound based on a control signal from a speaker arranged around a rotor;

converting the control sound and noise emitted from the rotor into a microphone signal by a microphone that is arranged around the rotor;

generating by a processing circuit, the control signal for reducing acoustic power in a position of the microphone, based on the microphone signal, rotation speed of the rotor, and a phase of noise that reaches the microphone from the rotor;

wherein:
- the processing circuit estimates main sound source volume velocity regarding a main sound source that simulates a noise occurrence location of the rotor, and calculates the control signal based on the main sound source volume velocity and a control sound source volume velocity phase difference regarding a control sound source that simulates a control sound occurrence location of the speaker;
- the processing circuit calculates control sound source volume velocity based on the rotation speed, the main sound source volume velocity, and the control sound source volume velocity phase difference, and
- the processing circuit calculates the control signal based on the control sound source volume velocity.

* * * * *